(12) United States Patent
Lee et al.

(10) Patent No.: US 12,539,028 B2
(45) Date of Patent: Feb. 3, 2026

(54) ORAL IMAGE PROCESSING DEVICE FOR PROCESSING ORAL IMAGE ACCORDING TO TIP COUPLED TO ORAL SCANNER AND ORAL IMAGE PROCESSING METHOD

(71) Applicant: MEDIT CORP., Seoul (KR)

(72) Inventors: Seung Jin Lee, Seoul (KR); Kwang Jin Jang, Seoul (KR); Jung Hwan Park, Seoul (KR)

(73) Assignee: MEDIT CORP., Seoul (KR)

( * ) Notice: Subject to any disclaimer, the term of this patent is extended or adjusted under 35 U.S.C. 154(b) by 337 days.

(21) Appl. No.: 18/036,245

(22) PCT Filed: Nov. 10, 2021

(86) PCT No.: PCT/KR2021/016356
§ 371 (c)(1),
(2) Date: May 10, 2023

(87) PCT Pub. No.: WO2022/103153
PCT Pub. Date: May 19, 2022

(65) Prior Publication Data
US 2023/0397804 A1   Dec. 14, 2023

(30) Foreign Application Priority Data

Nov. 11, 2020  (KR) ........................ 10-2020-0150507

(51) Int. Cl.
*A61B 1/24*  (2006.01)
*A61B 1/00*  (2006.01)
(Continued)

(52) U.S. Cl.
CPC ............ *A61B 1/24* (2013.01); *A61B 1/00009* (2013.01); *A61B 1/00016* (2013.01);
(Continued)

(58) Field of Classification Search
None
See application file for complete search history.

(56) References Cited

U.S. PATENT DOCUMENTS

| | | | |
|---|---|---|---|
| 9,506,808 B2* | 11/2016 | Jeon | G01J 1/0233 |
| 2008/0118886 A1* | 5/2008 | Liang | A61B 5/0088 |
| | | | 433/29 |

(Continued)

FOREIGN PATENT DOCUMENTS

| KR | 10-2015-0103133 A | 9/2015 |
|---|---|---|
| KR | 10-2015-0130938 A | 11/2015 |

(Continued)

OTHER PUBLICATIONS

Office Action issued from Korean Patent Application No. 10-2020-0150507 issued on Jun. 21, 2022.

(Continued)

*Primary Examiner* — Miya J Cato
(74) *Attorney, Agent, or Firm* — Sughrue Mion, PLLC

(57) ABSTRACT

An image processing apparatus is disclosed. The image processing apparatus includes a communicator configured to transmit or receive information to or from an intraoral scanner, a memory storing one or more instructions, and a processor configured to execute the one or more instructions stored in the memory to identify an oral image obtainment mode based on tip information about a tip included in the intraoral scanner, and obtain an oral image based on two-dimensional image data received from the intraoral scanner through the communicator and the identified oral image obtainment mode, wherein the tip information may include at least one of tip fastening direction information and tip size information.

14 Claims, 20 Drawing Sheets

(51) Int. Cl.
*A61B 1/05* (2006.01)
*A61B 1/06* (2006.01)
*A61C 9/00* (2006.01)

(52) U.S. Cl.
CPC ............ *A61B 1/00101* (2013.01); *A61B 1/05* (2013.01); *A61B 1/0676* (2013.01); *A61C 9/0053* (2013.01)

(56) References Cited

U.S. PATENT DOCUMENTS

| | | | |
|---|---|---|---|
| 2009/0279103 A1 | 11/2009 | Thiel et al. | |
| 2016/0338803 A1* | 11/2016 | Pesach | G06T 7/74 |
| 2020/0155285 A1* | 5/2020 | Pesach | A61C 17/022 |
| 2022/0087519 A1* | 3/2022 | Foged | A61B 1/043 |
| 2022/0110606 A1* | 4/2022 | Capri | A61B 8/4494 |
| 2022/0133447 A1* | 5/2022 | Hansen | A61B 5/0062 |
| | | | 382/128 |
| 2022/0151756 A1* | 5/2022 | Pesach | A61B 5/4547 |

FOREIGN PATENT DOCUMENTS

| | | |
|---|---|---|
| KR | 10-1662566 B1 | 10/2016 |
| KR | 10-2017-0142383 A | 12/2017 |
| KR | 10-2020-0113677 A | 10/2020 |
| WO | 2013/141502 A1 | 9/2013 |
| WO | 2014/102779 A2 | 7/2014 |
| WO | 2020/089406 A1 | 5/2020 |
| WO | 2020/144692 A2 | 7/2020 |
| WO | 2020/174048 A1 | 9/2020 |

OTHER PUBLICATIONS

Notice of Allowance issued from Korean Patent Application No. 10-2020-0150507 issued on Jan. 5, 2023.
International Search Report for PCT/KR2021/016356 dated Feb. 15, 2022 (PCT/ISA/210).
Extended European Search Report issued Aug. 13, 2024 in European Patent Application No. 21892320.9.

* cited by examiner (a)

(b)

(c)

(d)

(a)

(b)

(c)

(d)

(a)

(b)

OBJECT

OPTICAL SYSTEM 1210  1220

(c)

(d)

OBJECT

OPTICAL SYSTEM 1230  1240

(a)

(b)

ORAL IMAGE PROCESSING DEVICE FOR PROCESSING ORAL IMAGE ACCORDING TO TIP COUPLED TO ORAL SCANNER AND ORAL IMAGE PROCESSING METHOD

TECHNICAL FIELD

Disclosed embodiments relate to an oral image processing apparatus and an oral image processing method. In detail, the disclosed embodiments relate to an oral image processing apparatus for processing an oral image according to a tip coupled to an oral scanner, and to a method of the oral image processing apparatus.

BACKGROUND ART

Recently, as a method for obtaining oral information about a patient, an intraoral scanner that is inserted into the oral cavity of the patient and obtains an intraoral image has been used. The intraoral scanner may obtain two-dimensional scan data by scanning the intraoral image of the patient. A data processing apparatus, such as a personal computer (PC) connected to the intraoral scanner, may generate a three-dimensional virtual model by using the two-dimensional scan data obtained using the intraoral scanner.

Because the data processing apparatus is unable to identify whether the two-dimensional scan data obtained by the intraoral scanner is maxillary scan data, mandibular scan data, or occlusal scan data of the maxilla and mandible, a doctor or the like needs to operate the data processing apparatus to input which part the two-dimensional scan data obtained by the intraoral scanner is scan data for.

However, selecting scan data by operating the data processing apparatus, while capturing images of the oral cavity of a patient by using the intraoral scanner, is not only inconvenient but also not good for hygiene.

Also, unlike adults, children have a small oral cavity, and thus, it is difficult to scan the oral cavity by using a general-sized tip made to fit the oral cavity of an adult.

DISCLOSURE

Technical Solution

An image processing apparatus according to an embodiment includes a communicator configured to transmit or receive information to or from an intraoral scanner, a memory storing one or more instructions, and a processor configured to execute the one or more instructions stored in the memory to identify an oral image obtainment mode based on tip information about a tip included in the intraoral scanner, and obtain an oral image based on two-dimensional image data received from the intraoral scanner through the communicator and the identified oral image obtainment mode, wherein the tip information may include at least one of tip fastening direction information and tip size information.

MODE FOR INVENTION

Figure 1:
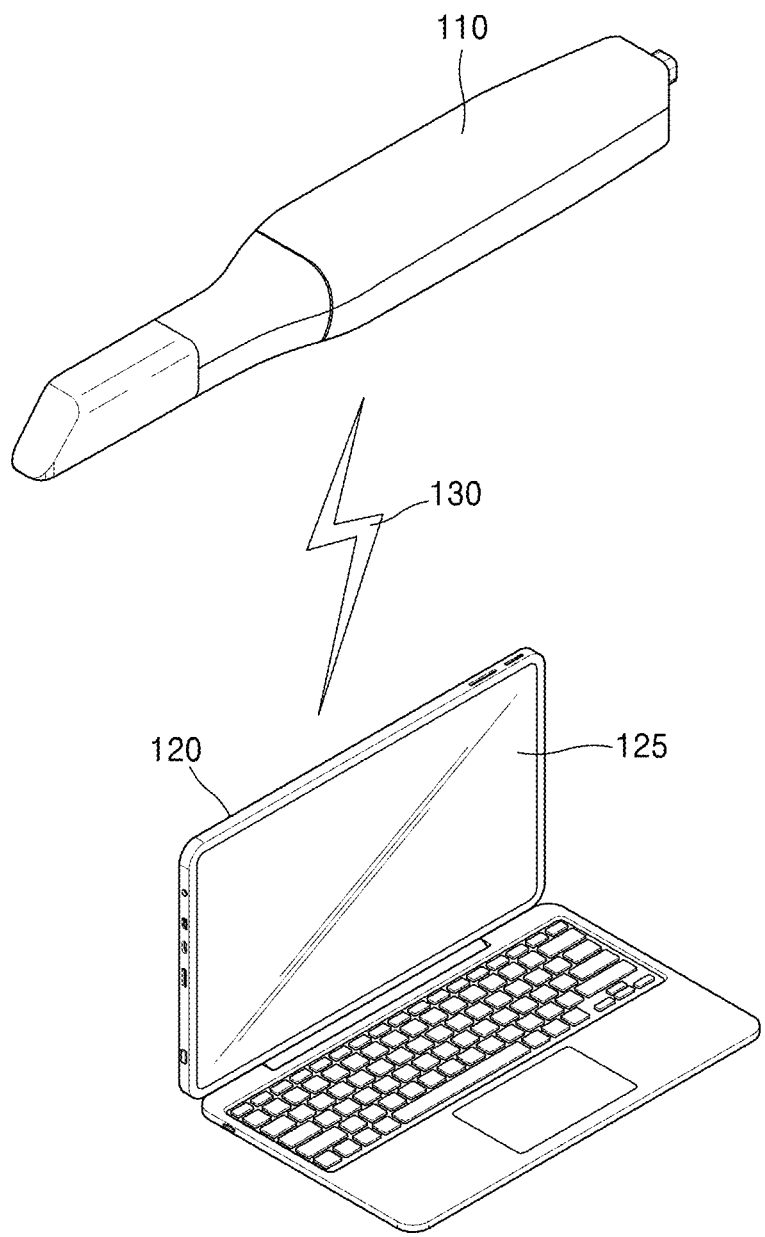
FIG. 1 is a diagram for describing an oral image processing system according to a disclosed embodiment.

In an embodiment, a processor may be configured to execute one or more instructions to receive tip information from an intraoral scanner through a communicator, or obtain the tip information from two-dimensional image data received through the communicator.

In an embodiment, the processor may be further configured to execute the one or more instructions to detect a reflective mirror area in the two-dimensional image data, and obtain the tip information based on at least one of a size and a shape of the reflective mirror area.

In an embodiment, the processor may be further configured to execute the one or more instructions to identify a projection mode according to tip size information, based on the tip information including the tip size information, generate control information according to the projection mode, transmit the control information to the intraoral scanner through the communicator, wherein the control information is information that controls the intraoral scanner to operate in a first projection mode when the tip is a first size tip, and controls the intraoral scanner to operate in a second projection mode when the tip is a second size tip, and receive, through the communicator, new two-dimensional image data obtained by the intraoral scanner operating based on the control information.

In an embodiment, the processor may be further configured to execute the one or more instructions to, based on the tip information including tip fastening direction information, identify a scan mode according to the tip fastening direction information, and obtain an oral image by processing the two-dimensional image data according to the identified scan mode, wherein the identified scan mode may be one of a maxillary scan mode, a mandibular scan mode, and an occlusal scan mode.

An intraoral scanner according to an embodiment includes an intraoral scanner main body, and a tip detachably coupled to the intraoral scanner main body, wherein the intraoral scanner main body may include a camera configured to obtain two-dimensional image data by scanning an oral cavity, a memory storing one or more instructions, and a processor configured to execute the one or more instructions stored in the memory to obtain tip information about the tip coupled to the intraoral scanner main body, and the tip information may include at least one of tip fastening direction information and tip size information.

In an embodiment, the intraoral scanner main body may further include a sensor, a wall of the tip may have at least one of a different thickness and a different color for each direction, and the sensor may be configured to sense the tip and obtain the tip information based on at least one of a distance from the sensor to the wall of the tip and a color of the wall of the tip.

In an embodiment, the intraoral scanner main body may further include a sensor, the tip may include a plurality of protrusions and is rotatable while being coupled to the intraoral scanner main body, and the sensor may be configured to sense the tip and obtain the tip information based on at least one of a distance from the sensor to a protrusion identified according to a rotation of the tip and a color of the protrusion.

In an embodiment, the processor may be further configured to execute the one or more instructions to detect a reflective mirror area in the two-dimensional image data obtained by the camera, and obtain the tip information based on at least one of a size and a shape of the reflective mirror area.

In an embodiment, the intraoral scanner main body may further include a communicator configured to transmit or receive information to or from an image processing apparatus, wherein the communicator may be further configured to transmit the obtained two-dimensional image data and the tip information to the image processing apparatus.

In an embodiment, the intraoral scanner main body may further include a projector configured to project light, the communicator may be further configured to receive, from the image processing apparatus, control information generated based on the tip information, the control information may be information that controls the intraoral scanner to operate in a first projection mode when the tip is a first size tip, and controls the intraoral scanner to operate in a second projection mode when the tip is a second size tip, and the processor may be further configured to execute the one or more instructions to when the control information is information indicating operation in a first projection mode, allow the projector to project light from a first projection area and the camera to obtain two-dimensional image data from a first ROI, and when the control information is information indicating operation in a second projection mode, allow the projector to project light from a second projection area and the camera to obtain two-dimensional image data from a second ROI, the second projection area being smaller than the first projection area, and the second ROI being smaller than the first ROI.

In an embodiment, the processor may be further configured to execute the one or more instructions to identify an oral image obtainment mode based on the tip information, and obtain an oral image based on the two-dimensional image data and the identified oral image obtainment mode.

In an embodiment, the processor may be further configured to execute the one or more instructions to, based on the tip information including the tip fastening direction information, identify a scan mode according to the tip fastening direction information, and obtain the oral image by processing the two-dimensional image data according to the identified scan mode, wherein the identified scan mode may be one of a maxillary scan mode, a mandibular scan mode, and an occlusal scan mode.

In an embodiment, the intraoral scanner main body may further include a projector configured to project light, and the processor may be further configured to execute the one or more instructions to identify a projection mode according to the tip size information, based on the tip information including the tip size information, when the identified projection mode is a first projection mode, allow the projector to project light from the first projection area and the camera to obtain the two-dimensional image data from a first ROI, and when the identified projection mode is a second projection mode, allow the projector to project light from a second projection area and the camera to obtain the two-dimensional image data from a second ROI, the second projection area being smaller than the first projection area, and the second ROI being smaller than the first ROI.

In an embodiment, the second projection area and the second ROI may be determined based on a size of a reflective mirror area included in the two-dimensional image data.

An image processing method according to an embodiment includes obtaining two-dimensional image data by scanning an oral cavity, obtaining tip information about a tip coupled to an intraoral scanner main body, identifying an oral image obtainment mode based on the tip information, and obtaining an oral image based on the two-dimensional image data and the identified oral image obtainment mode, wherein the tip information may include at least one of tip fastening direction information and tip size information.

An image processing system according to an embodiment includes an intraoral scanner configured to obtain two-dimensional image data by scanning an oral cavity, and an image processing apparatus configured to generate an oral image by processing the two-dimensional image data received from the intraoral scanner, wherein the intraoral scanner may include an intraoral scanner main body, and a tip detachably coupled to the intraoral scanner main body, and the image processing apparatus may be configured to obtain tip information about the tip, identify an oral image obtainment mode based on the tip information, and obtain an oral image by processing two-dimensional image data received from the intraoral scanner based on the identified oral image obtainment mode.

The specification clarifies the scope of the application, explains the principles of the application, and discloses embodiments, such that the embodiments of the application may be practiced by those of ordinary skill in the art. The disclosed embodiments may be implemented in various forms.

Throughout the specification, like reference numerals refer to like components. All components in embodiments are not described herein, and general descriptions or redundant descriptions of the embodiments in the technical field to which the application pertains will be omitted. The term 'part' or 'portion' used herein may be implemented in software or hardware, and according to the embodiments, a plurality of 'parts' or 'portions' may be implemented as one unit or element, or a single 'part' or 'portion' may also include a plurality of units or elements. Hereinafter, the principles and embodiments of the application will be described with reference to the accompanying drawings.

In the specification, an image may include an image (hereinafter, referred to as an 'oral image') representing at least one tooth or an oral cavity including at least one tooth.

Also, in the specification, an image may include a two-dimensional image of an object, or a three-dimensional model or three-dimensional image representing an object in three dimensions.

In addition, in the specification, the term 'data' may refer to information required to represent an object in two dimensions or in three dimensions, for example, raw data obtained using at least one camera.

In detail, the raw data is data obtained to generate an oral image and may include data (e.g., two-dimensional data) obtained by at least one image sensor included in an intraoral scanner, when the oral cavity of a patient, which is an object, is scanned using the intraoral scanner. The raw data obtained by the intraoral scanner may be referred to as scan data or two-dimensional image data. The raw data may refer to two-dimensional images at different viewpoints obtained by a plurality of cameras when the object is scanned using the intraoral scanner.

In the specification, the term 'object' refers to an object of which image is to be captured, and may include a human, an animal, or a part thereof. The object may include an oral cavity including at least one tooth. For example, the object may include a tooth, gingiva, at least a portion of the oral cavity, and/or an artificial structure (e.g., an orthodontic appliance, an implant, an artificial tooth, an orthodontic aid inserted into the oral cavity, etc.) insertable into the oral cavity.

Hereinafter, embodiments will be described in detail with reference to the accompanying drawings.

FIG. 1 is a diagram for describing an oral image processing system according to a disclosed embodiment.

Referring to FIG. 1, the oral image processing system may include an intraoral scanner 110 and a data processing apparatus 120 coupled with the intraoral scanner 110 via a communication network 130.

The intraoral scanner 110 is a medical apparatus obtaining an intraoral image. In detail, the intraoral scanner 110 may be inserted into the oral cavity to scan teeth in a contactless manner, and obtain an image of the oral cavity including at least one tooth. Also, the intraoral scanner 110 may have a shape capable of being drawn in and out of the oral cavity and may scan the inside of the oral cavity of a patient by using at least one image sensor (e.g., an optical camera). The intraoral scanner 110 is a handheld scanner, and may generate three-dimensional data by obtaining surface information about the object as two-dimensional image data.

The two-dimensional image data obtained by the intraoral scanner 110 may be transmitted to the data processing apparatus 120 connected via the communication network 130.

The data processing apparatus 120 may include any electronic apparatus that is connected to the intraoral scanner 110 via the communication network 130, wired or wireless, may receive, from the intraoral scanner 110, two-dimensional image data obtained by scanning the oral cavity, and may generate, process, display, and/or transmit an oral image based on the received two-dimensional image data.

The data processing apparatus 120 may generate, based on the two-dimensional image data received from the intraoral scanner 110, at least one of information generated by processing the two-dimensional image data and an oral image generated by processing the two-dimensional image data, and may display the generated information and oral image through a display 125.

The data processing apparatus 120 may include a computing apparatus, such as a smartphone, a laptop computer, a desktop computer, a personal digital assistance (PDA), or a tablet personal computer (PC), but is not limited thereto.

The data processing apparatus 120 may also exist in a form of a server (or server apparatus) for processing an oral image.

The intraoral scanner 110 may transmit raw data obtained through intraoral scanning to the data processing apparatus 120 as it is. In this case, the data processing apparatus 120 may generate a three-dimensional oral image representing the oral cavity in three dimensions based on the received raw data. Also, the 'three-dimensional oral image' may be generated by modeling an internal structure of the oral cavity in three dimensions based on the received raw data, and thus may also be referred to as a 'three-dimensional oral model'. Hereinafter, a model or image representing the oral cavity in two dimensions or in three dimensions will be collectively referred to as an 'oral image'.

The data processing apparatus 120 may analyze and/or process the generated oral image and output or transmit the same to the display 125 and/or an external apparatus.

As another example, the intraoral scanner 110 may obtain raw data through intraoral scanning, process the obtained raw data, generate an image corresponding to the oral cavity, which is an object, and transmit the image to the data processing apparatus 120.

In an embodiment, the intraoral scanner 110 may obtain three-dimensional data representing a shape of the object by projecting patterned light onto the object and scanning the object onto which the patterned light is projected.

In an embodiment, the intraoral scanner 110 may also obtain three-dimensional data of the object by using a confocal method. The confocal method is a non-destructive optical imaging technique for measuring a three-dimensional surface, and an optical cross-sectional image with high spatial resolution may be obtained by using a pinhole structure. The intraoral scanner 110 may obtain three-dimensional data by stacking obtained two-dimensional images in an axial direction.

However, this is merely an embodiment, and the intraoral scanner 110 may obtain an oral image from raw data by using various methods other than the aforementioned methods. The intraoral scanner 110 may transmit three-dimensional data to the data processing apparatus 120. In this case, the data processing apparatus 120 may analyze, process, display, and/or transmit a received image.

Figure 2:
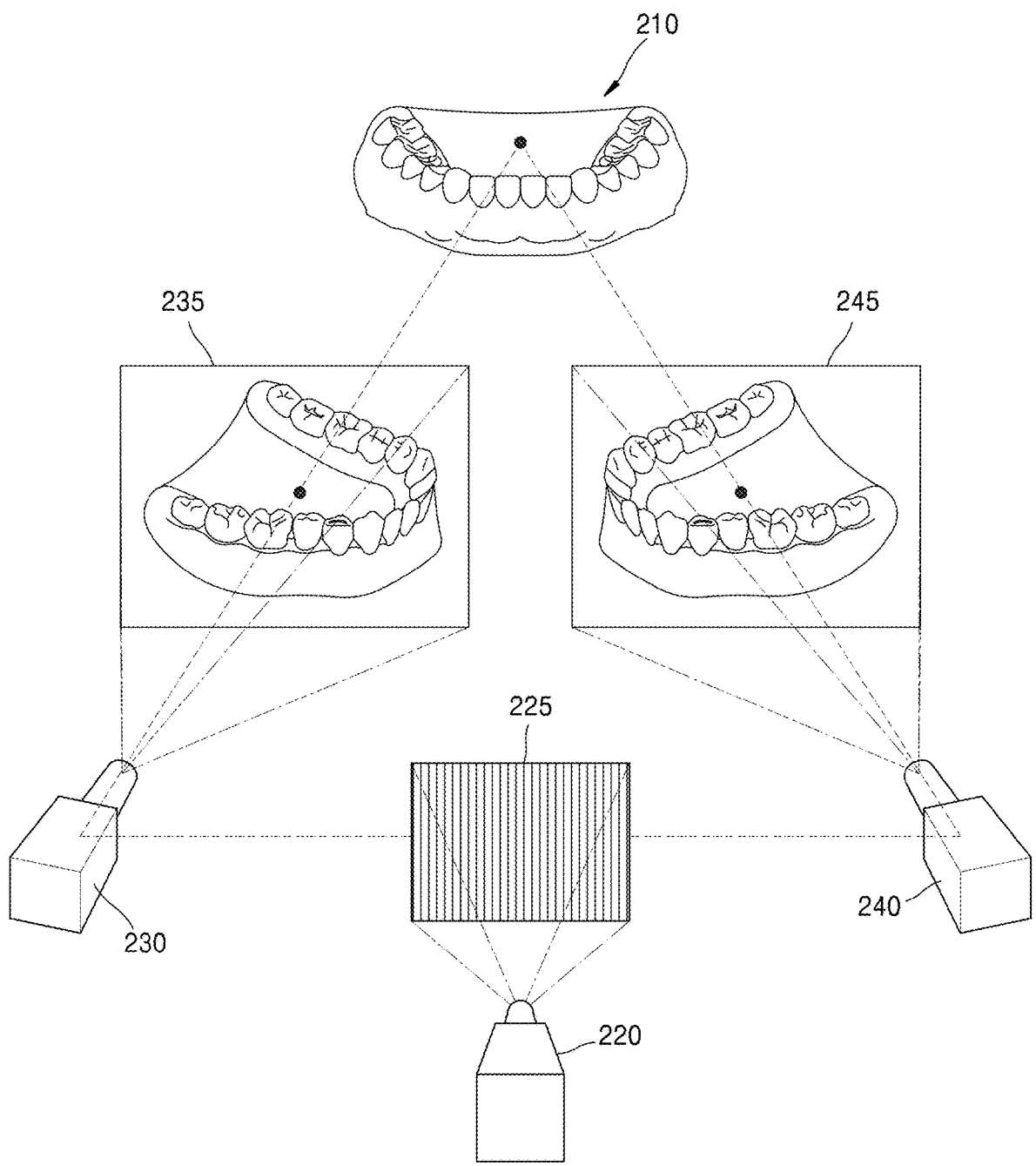
FIG. 2 is a diagram for describing a method, performed by an intraoral scanner, of obtaining surface data, according to an embodiment.

FIG. 2 is a diagram for describing a method, performed by an intraoral scanner, of obtaining surface data, according to an embodiment.

In an embodiment, the intraoral scanner may obtain an image by using at least one camera, and obtain three-dimensional data based on the obtained image. In FIG. 2, the intraoral scanner may include an optical three-dimensional scanner. The intraoral scanner may use a structured light with stereo vision method to obtain three-dimensional data about a surface of an object 210.

The intraoral scanner may include at least two cameras 230 and 240, and a projector 220 capable of projecting structured light 225. In an embodiment, the intraoral scanner may project the structured light 225 onto the object 210, and obtain an L image 235 corresponding to a left field of view and an R image 245 corresponding to a right field of view from an L camera 230 corresponding to the left field of view and an R camera 240 corresponding to the right field of view, respectively. The L image 235 and the R image 245 may be reconstructed into a three-dimensional frame representing the surface of the object 210.

The intraoral scanner may consecutively obtain a two-dimensional image frame including the L image 235 and the R image 245 of the object 210. The intraoral scanner or a data processing apparatus may obtain a three-dimensional image frame representing a surface shape of the object 210 from the two-dimensional image frame including the L image 235 and the R image 245. In FIG. 2, it has been described that the intraoral scanner obtains three-dimensional data from two images obtained by using the two cameras 230 and 240, but this is merely an embodiment. The intraoral scanner may also obtain an image by using only one of the two cameras 230 and 240.

The intraoral scanner may obtain a plurality of two-dimensional frames by scanning the object 210 at regular time intervals (e.g., 10 to 30 frames per second) while moving around the object 210. The intraoral scanner or the data processing apparatus may obtain a plurality of three-dimensional image frames from the plurality of two-dimensional image frames.

The data processing apparatus may obtain three-dimensional image data of the entire object 210 by merging or aligning the plurality of three-dimensional image frames.

Figure 3:
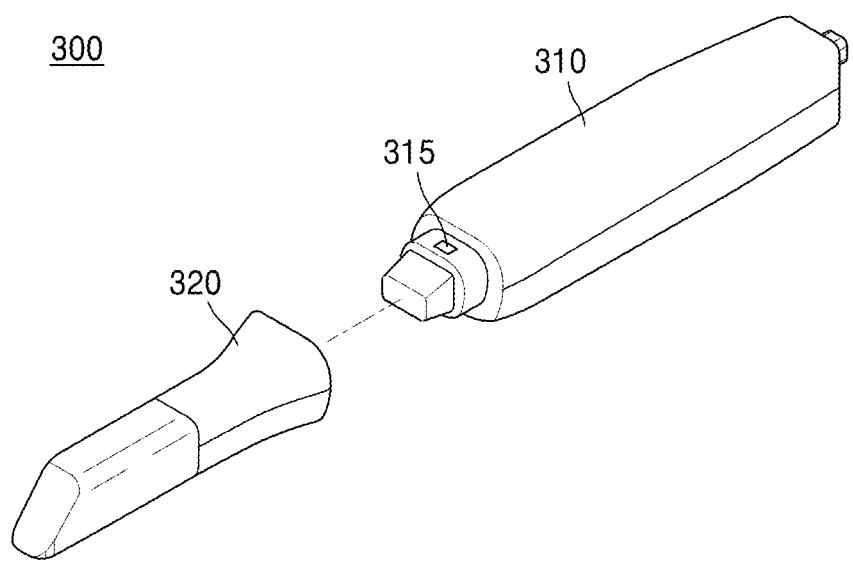
FIG. 3 is a perspective view of an intraoral scanner according to an embodiment.

FIG. 3 is a perspective view of an intraoral scanner according to an embodiment.

Referring to FIG. 3, an intraoral scanner 300 may include a main body 310 and a tip 320.

The main body 310 may include a light projector that projects light, and a camera that obtains an image by photographing an object.

The tip 320 is a portion mounted on the main body 310 and inserted into the oral cavity, and may be formed long to be easily inserted into the oral cavity. The tip 320 may include an optical path change means that is detachably coupled to the main body 310, directs light projected from the main body 310 to the object, and directs light received from the object to the main body 310.

One end of the tip 320 may be coupled to the main body 310. The tip 320 has a detachable structure without being fixed to the main body 310, and may be mounted on the main body 310.

The other end of the tip 320 may include an opening. The opening may be formed in one direction orthogonal to a longitudinal direction of the tip 320. Light projected by the light projector may be leaked out through the opening, and light reflected from the object may be introduced into the camera.

For example, a mirror may be arranged in the opening as a means for changing an optical path. The mirror may reflect light along a certain path, such that light emitted from the light projector is projected toward the object. Also, the mirror may adjust the optical path, such that light reflected from the object and incident through the opening of the tip 320 is directed to a lens of the camera.

Because the mirror is attached to the inside of the tip 320 in a fixed form, a projection direction of light projected from a projector is also fixed. Accordingly, in general, in order to scan the oral cavity of a patient, a user using the intraoral scanner 300 mounts the tip 320 on the main body 310 in a fixed direction, for example, such that the top of the tip 320 is engaged with the top of the main body 310.

In addition, data obtained by the intraoral scanner 300 is processed by the main body 310 of the intraoral scanner, or processed by being transmitted to the data processing apparatus. In this regard, the main body 310 of the intraoral scanner or the data processing apparatus is unable to identify whether the obtained data is data obtained by scanning maxilla, data obtained by scanning mandible, or occlusal data in which the maxilla and mandible bite each other. Accordingly, before obtaining scan data by scanning the oral cavity, a user needs to set a scan mode to one of a maxillary scan mode, a mandibular scan mode, or an occlusal scan mode in the main body 310 of the intraoral scanner or the data processing apparatus, and then perform the scanning. Otherwise, even though the intraoral scanner 300 scans the mandible, the main body 310 of the intraoral scanner or the data processing apparatus may generate an incorrect image by misidentifying data received from the intraoral scanner 300 as maxillary data or occlusal data rather than mandibular data. However, it is not only inconvenient for the user to manually set the scan mode by operating the main body 310 of the intraoral scanner or the data processing apparatus whenever the user scans the oral cavity, but it is also hygienically not good.

In an embodiment, the tip 320 coupled to the main body 310 does not need to be coupled to the main body 310 in a certain direction. For example, only the top of the tip 320 does not need to be engaged with the top of the main body 310, and the top, bottom, or side surface of the tip 320 may be engaged with the top of the main body 310.

In an embodiment, the intraoral scanner 300 includes a sensor 315 in the main body 310, and thus may identify a fastening direction of the tip 320 by sensing the tip 320 mounted on the main body 310.

In an embodiment, the intraoral scanner 300 may also obtain information about the tip 320 based on two-dimensional image data of the oral cavity obtained using the camera included in the main body 310. That is, when the intraoral scanner 300 is able to identify a mirror area from other areas in the image data obtained using the camera, the intraoral scanner 300 may identify the mirror area and identify a fastening direction of the tip 320 based on a shape of the mirror area. In an embodiment, the intraoral scanner 300 may identify a scan mode according to the identified fastening direction of the tip 320. The identified scan mode may include one of the maxillary scan mode, the mandibular scan mode, and the occlusal scan mode.

In an embodiment, the intraoral scanner 300 may directly obtain a three-dimensional oral image representing maxilla, mandible, or occlusion of a patient by processing the raw data, obtained by scanning the maxilla, mandible, or occlusion, according to the scan mode, and may transmit the three-dimensional oral image to the data processing apparatus.

In another embodiment, the intraoral scanner 300 may transmit the identified scan mode to the data processing apparatus. In this case, the data processing apparatus may identify, according to the scan mode received from the intraoral scanner 300, whether an object to be scanned is the maxilla, mandible, or occlusion in which both the maxilla and mandible are included.

Also, the intraoral scanner 300 may obtain raw data by scanning the maxilla, mandible, or occlusion of the patient, and transmit the raw data to the data processing apparatus. The data processing apparatus may receive the scan mode and the raw data from the intraoral scanner 300, process the raw data according to the received scan mode, obtain a three-dimensional oral image representing the maxilla, mandible, or occlusion, and output the three-dimensional oral image on the display. Also, the data processing apparatus may also display the scan mode received from the intraoral scanner 300 on the display.

Accordingly, according to an embodiment, because the intraoral scanner 300 identifies the fastening direction of the tip 320 by using the sensor 315 or the two-dimensional image data obtained using the camera, and transmits the same to the data processing apparatus, the data processing apparatus automatically obtains an oral image in a scan mode suitable for the direction of the tip 320, and thus, it is unnecessary for the user to set the scan mode by separately operating the data processing apparatus.

In addition, the sensor 315 may also identify a size of the tip 320, in addition to the fastening direction of the tip 320.

Unlike adults, children have a small oral cavity and small teeth in the oral cavity. Therefore, when a general-sized tip made to fit the oral cavity of an adult is used, it is difficult to obtain accurate data by accurately scanning the oral cavity of a child. In addition, when scan data for the oral cavity of the child is obtained by using the general-sized tip made to fit the oral cavity of the adult, even though an obtained oral image includes a small area of the oral cavity of the child, image processing is performed to other unnecessary areas.

In an embodiment, the tip 320 does not have only one fixed size, but may be manufactured to have various different sizes.

In an embodiment, the tip 320 may include a first size tip having a first size, and a second size tip having a second size. In this case, the first size may refer to a different size from the second size.

For example, the first size tip may be a general-sized tip, and the second size tip may be a small-sized tip smaller than the general-sized tip.

The small-sized tip may refer to a tip having a size of a mirror mounted in the tip less than that of the general-sized tip and having a width less than that of the general-sized tip.

In an embodiment, the sensor 315 may sense the tip 320 and identify whether the tip 320 is a general-sized tip or small-sized tip.

In an embodiment, the intraoral scanner 300 may identify whether the tip 320 is the general-sized tip or small-sized tip, based on the two-dimensional image data of the oral cavity obtained using the camera. The intraoral scanner 300 may identify the mirror area in the image data obtained using the camera, and identify the size of the tip 320 based on the size of the mirror area.

Because the small-sized tip has a smaller mirror and less width than those of the general-sized tip, when light having the same area as when the general-sized tip is used is projected, the projected light may collide with a wall of the small-sized tip and cause diffuse reflection.

Accordingly, in an embodiment, the intraoral scanner 300 may obtain an oral image in different projection modes according to the size of the tip 320. That is, an oral image may be obtained by adjusting the projection area and a region of interest (ROI) of the camera differently when the tip 320 of the intraoral scanner 300 has a general size and a small size.

As described above, according to an embodiment, the intraoral scanner 300 may identify the fastening direction or size of the tip 320 by using the sensor 315 or the camera, and may obtain an oral image in different scan modes or obtain the oral image in different projection modes, based on the fastening direction and size.

Figure 4:
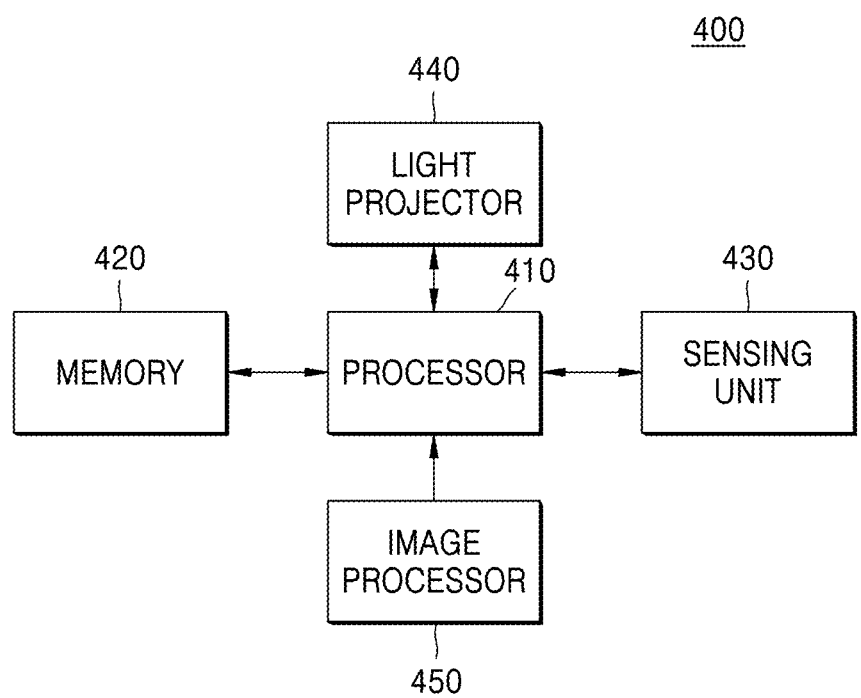
FIG. 4 is a block diagram of an internal structure of an oral image processing apparatus, according to an embodiment.

FIG. 4 is a block diagram of an internal structure of an oral image processing apparatus 400, according to an embodiment.

The oral image processing apparatus 400 may include an intraoral scanner and a data processing apparatus.

Referring to FIG. 4, the oral image processing apparatus 400 may include a processor 410, a memory 420, a sensing unit 430, a light projector 440, and an image processor 450.

The memory 420 may store at least one instruction. Also, the memory 420 may store at least one instruction executable by the processor 410. In addition, the memory 420 may store at least one program executable by the processor 410.

The sensing unit 430 may include at least one sensor. The sensor included in the sensing unit 430 may include a proximity sensor. The sensing unit 430 may sense a tip and obtain tip information from the tip based on at least one of a distance from the proximity sensor to a wall of the tip and a color of the wall of the tip.

In an embodiment, the tip may include a plurality of protrusions. Also, the tip may be rotated while being mounted on a main body. The plurality of protrusions included in the tip may have different thicknesses or different colors.

When the tip includes a protrusion and is rotatable in engagement with the main body, the sensing unit 430 may obtain tip information by obtaining, with respect to a protrusion identified according to a rotation of the tip, at least one of a distance from the sensor to the protrusion and a color of the protrusion.

The light projector 440 may project light. The light projector 440 may include a projector that projects light from a light source. The light projected by the light projector 440 may be projected toward an opening by a mirror mounted on the tip, and is projected onto an object through the opening. However, the disclosure is not limited thereto, and a prism that refracts projected light may also be mounted on the tip instead of the mirror. The prism may refract the light projected from the light projector 440 to a different degree according to a type of a medium or an angle between faces of the prism.

In an embodiment, the light projector 440 may project light from different projection areas according to a projection mode.

In an embodiment, the projection mode may include different modes for respective sizes of the tip. For example, the projection mode may include a first projection mode for projecting light having an area suitable for the first size tip when the tip is the first size tip, and a second projection mode for projecting light having an area suitable for the second size tip when the tip is the second size tip.

The first projection mode may be a general projection mode, and the second projection mode may be a small projection mode.

The light projector 440 may project light from a projection area having different sizes when the projection mode is the general projection mode and the small projection mode.

The image processor 450 may perform operations for generating and/or processing an image. The image processor 450 may include at least one camera. The image processor 450 may obtain data corresponding to at least one of a left field of view and a right field of view by capturing, using the camera, an image of an object onto which light is projected by the light projector 440. The image processor 450 may obtain two-dimensional image data by scanning the oral cavity.

In an embodiment, the image processor 450 may obtain one of a maxillary image, a mandibular image, or an occlusal image by using the two-dimensional image data obtained through the camera. In an embodiment, when the tip information includes information about a fastening direction of the tip, the image processor 450 may process an image in a specific scan mode under control by the processor 410. That is, the image processor 450 may obtain a maxillary, mandibular, or occlusal image by processing raw data according to the scan mode identified by the processor 410.

The processor 410 may control the entire oral image processing apparatus 400. The processor 410 may identify an oral image obtainment mode based on the tip information. When the tip information includes the fastening direction of the tip, the processor 410 may identify a scan mode according to the fastening direction of the tip. The processor 410 may identify one of a maxillary scan mode, a mandibular scan mode, and an occlusal scan mode, and allow the image processor 450 to obtain an oral image according to the identified scan mode.

The processor 410 may identify, based on the tip information, whether the tip has a general size or small size. When the tip is the small-sized tip, the processor 410 may control the oral image processing apparatus 400 to obtain an oral image suitable for a size of a mirror included in the small-sized tip. That is, the processor 410 may control the light projector 440 to reduce an area of light projected by the light projector 440. Also, the processor 410 may control the image processor 450 to reduce an ROI of the camera that obtains an image.

In an embodiment, the processor 410 may directly detect the size of the mirror included in the small-sized tip. For this, the processor 410 may detect a mirror area included in the small-sized tip in the image obtained by the image processor 450.

In an embodiment, the processor 410 may also obtain tip information by using the two-dimensional image data obtained using the camera included in the image processor 450. For example, when the small-sized tip is mounted, but an area a projector projects light and an ROI from which the camera obtains an image are set to fit the general-sized tip, a portion of light projected by the projector collides with an inner wall of the tip and causes diffuse reflection, and only light reflected by the mirror inside the small-sized tip is projected onto the object. In this case, the two-dimensional image data obtained using the camera may include an area obtained for the object, that is, a mirror area, and a non-mirror area. In an embodiment, the intraoral scanner 300 may detect a mirror area in the two-dimensional image data, and may identify a direction or size of the tip based on at least one of a size and shape of the mirror area.

The processor 410 may control the light projector 440 and the image processor 450 to adjust the projected light area and the ROI of the camera according to the detected mirror area.

The processor 410 may control at least one component included in the oral image processing apparatus 400 to perform an intended operation. Accordingly, even though a case in which the processor 410 performs certain operations is described as an example, it may mean that the processor 410 controls at least one component included in the oral image processing apparatus 400 to perform the certain operations.

In order to implement embodiments disclosed in the disclosure, the oral image processing apparatus 400 may include only some of the components shown in FIG. 4 or may include more components in addition to the components shown in FIG. 4.

Figure 5:
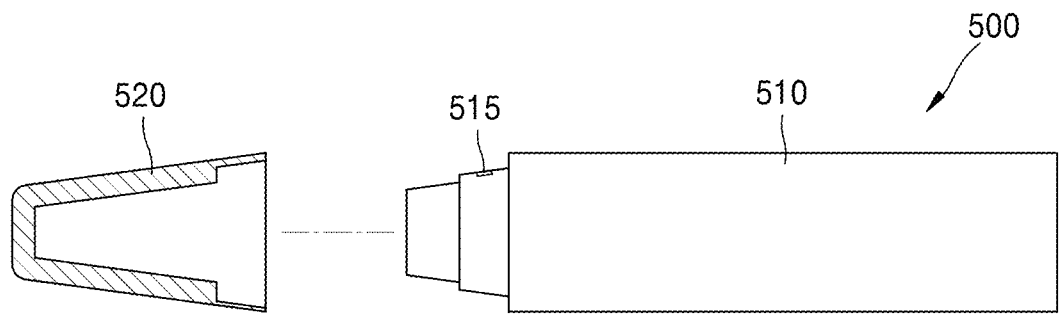
FIG. 5 is a diagram for describing that an intraoral scanner obtains tip information by using a sensor, according to an embodiment.
Figure 5:
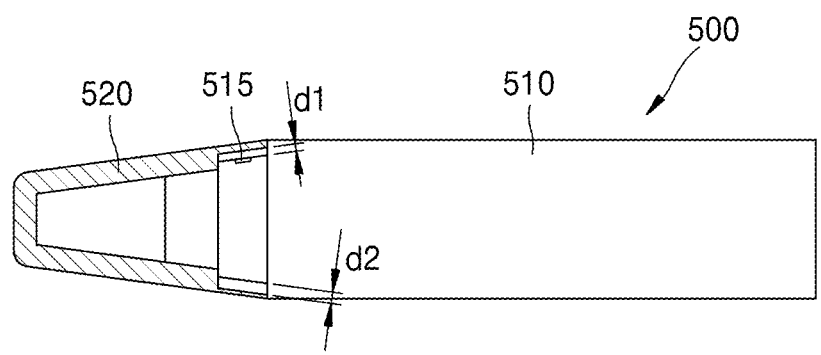
Figure 5:
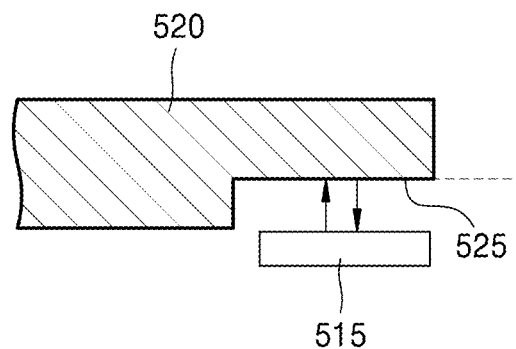
Figure 5:
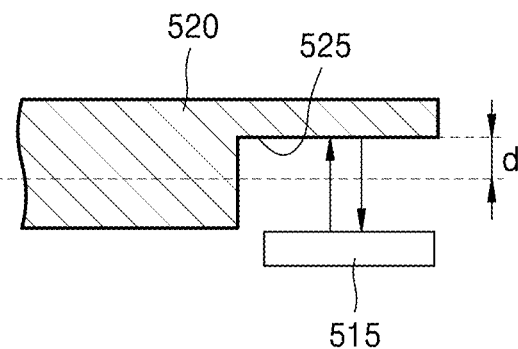

FIG. 5 is a diagram for describing that an intraoral scanner obtains tip information by using a sensor, according to an embodiment.

Referring to FIG. 5, an intraoral scanner 500 may include a main body 510 and a tip 520. The tip 520 may be detachably coupled to the main body 510.

In an embodiment, a sensor 515 for sensing the tip 520 may be arranged in the main body 510. The sensor 515 may be arranged in an area of the main body 510, in which the main body 510 and the tip 520 are coupled to each other.

As shown in (a) and (b) of FIG. 5, when the tip 520 is coupled to the main body 510 and covers the main body 510, the sensor 515 may be arranged in the area in which the main body 510 and the tip 520 are coupled to each other, outside the top or bottom of the main body 510. However, this is merely an embodiment, and a position where the sensor 515 is mounted on the main body 510 may be changed according to a coupling structure between the tip 520 and the main body 510.

As shown in (a) and (b) of FIG. 5, the tip 520 may be coupled to the main body 510 while being spaced apart from the sensor 515 by a certain distance d1. As shown in FIG. 5, an outer surface of the main body 510 and an inner wall of the tip 520 may face and be coupled to each other.

The sensor 515 may include a proximity sensor capable of detecting the presence of a nearby object without physical contact. The sensor 515 may emit an electromagnetic field or electromagnetic wave, an ultrasonic wave, etc., measure an amount or a return time of light returning after an emitted signal is reflected by a wall 525 of the tip 520, which is an object, and identify a distance between the wall 525 of the tip 520 and the sensor 515.

In an embodiment, a thickness of the inner wall of the tip 520 may have different values according to a fastening direction of the tip 520, for example, at the top, bottom, and side surface of the tip 520.

In (b) of FIG. 5, it is shown that inner walls at the top and bottom of the tip 520 have different thicknesses. According to whether a direction of the tip 520 coupled to the top of the main body 510 is an upward or downward direction, the distance from the sensor 515 to the inner wall of the tip 520 varies as d1 or d2.

(c) and (d) of FIG. 5 show that the inner wall 525 at the top and bottom of the tip 520 have different thicknesses. (c) of FIG. 5 shows a distance from the sensor 515 to the inner wall 525 when the top of the tip 520 is coupled to the top of the main body 510, and (d) of FIG. 5 shows a distance from the sensor 515 to the inner wall 525 when the bottom of the tip 520 is coupled to the top of the main body 510. It may be seen that a separation distance between the inner wall 525 at the bottom of the tip 520 and the sensor 515 is longer by d than a separation distance between the inner wall 525 at the top of the tip 520 and the sensor 515.

In an embodiment, the sensor 515 may sense a distance between the inner wall 525 and the sensor 515. The sensor 515 may emit an ultrasonic wave or infrared ray to the inner wall 525, and sense a distance to the inner wall 525 based on an amount of light returning after the emitted ultrasonic wave or infrared ray is reflected by the inner wall 525. Alternatively, the sensor 515 may emit an infrared ray, measure a time until an emitted signal is reflected by the inner wall 525 and returns to the sensor 515, and measure the distance to the inner wall 525.

The sensor 515 may obtain a fastening direction of the tip 520 as tip information, according to the distance between the inner wall 525 and the sensor 515. That is, the sensor 515 may identify whether the top of the tip 520 is fastened, the bottom of the tip 520 is fastened, or the side surface of the tip 520 is fastened.

In an embodiment, the thickness of the inner wall 525 of the tip 520 may vary according to the size of the tip 520. For example, when the tip 520 has a general size and a small size, the tip 520 may include the inner wall 525 having different thicknesses.

In an embodiment, the sensor 515 may sense the distance between the inner wall 525 and the sensor 515, and obtain, as tip information, the size of the tip 520, that is, whether the tip 520 has a general size or small size, according to the sensed distance.

Figure 6:
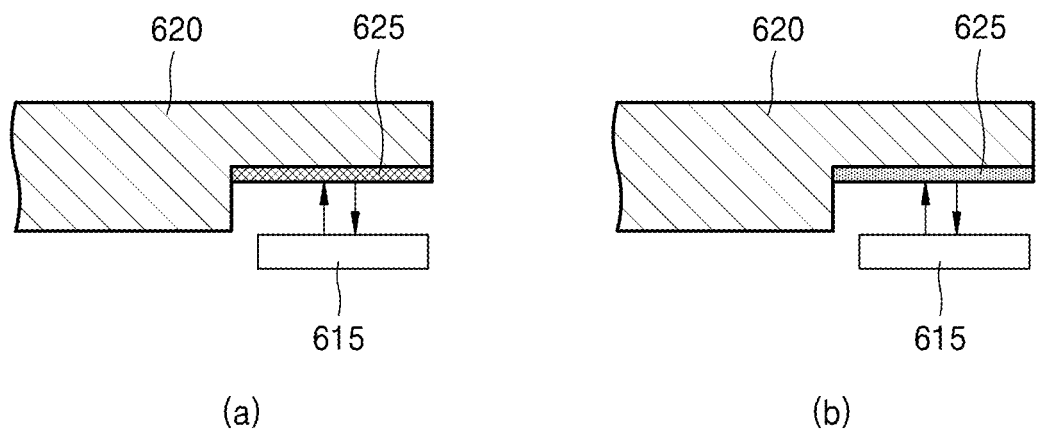
FIG. 6 is a diagram for describing that an intraoral scanner obtains tip information by using a sensor, according to an embodiment.

FIG. 6 is a diagram for describing a process in which an intraoral scanner obtains tip information by using a sensor, according to an embodiment.

As in FIG. 5, in FIG. 6, a tip 620 may have a structure coupled to a main body and covering the main body. A sensor 615 may be arranged outside the main body. An inner portion of the tip 620 may be spaced apart from the sensor 615 by a certain distance and coupled to the main body.

In an embodiment, an inner wall 625 of the tip 620 may have a different color according to a direction. For example, surface colors of the inner wall 625 at the top, bottom, and side surface of the tip 620 may be different from each other.

(a) and (b) of FIG. 6 show that the inner wall 625 at the top and bottom of the tip 620 has different colors.

In an embodiment, the sensor 615 may obtain tip information by using the color of the inner wall 625. For example, the sensor 615 may identify the color of the inner wall 625 by emitting an infrared ray to the inner wall 625 and measuring an amount of light obtained by a signal emitted to the inner wall 625 returning to the sensor 615. An infrared signal has a property of being reflected from an object as a color of the object is brighter, and has a property of being absorbed by the object as the color of the object is darker. Accordingly, a large amount of light of a reflected signal may mean that the color of the inner wall 625 is bright, and a small amount of light may mean that the color of the inner wall 625 is dark. That is, when a distance between the sensor 615 and the inner wall 625 is the same, an amount of light returning after being reflected increases as the color of the object is brighter.

The sensor 615 may detect a surface color of the inner wall 625 by calculating chromaticity coordinates from the light reflected by the tip 620 and comparing the chromaticity coordinates with stored reference chromaticity coordinates.

In an embodiment, the sensor 615 may identify the color of the inner wall 625 and detect whether a fastening direction of the tip 620 is an upward, downward, or lateral direction, according to the identified color.

In an embodiment, the color of the inner wall 625 may vary according to a size of the tip 620. That is, the inner wall 625 of the tip 620 having a general size and a small size may have different colors.

In an embodiment, the sensor 615 may sense the color of the inner wall 625, obtain information about the tip 620 according to the sensed color, and identify whether the tip 620 has a general size or small size.

Figure 7:
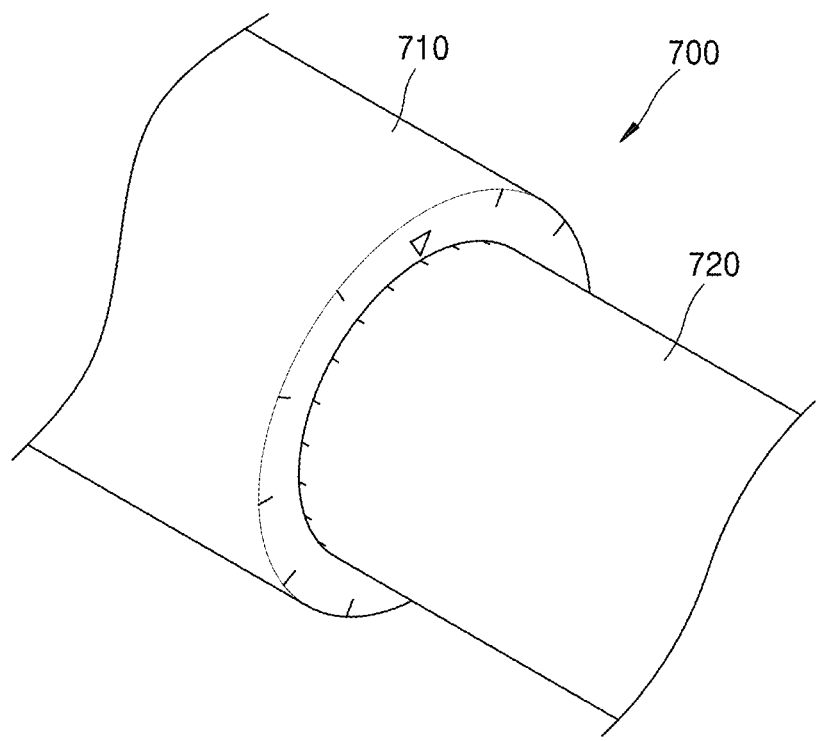
FIG. 7 is a diagram for describing that an intraoral scanner obtains tip information by using a sensor, according to an embodiment.

FIG. 7 is a diagram for describing that an intraoral scanner obtains tip information by using a sensor, according to an embodiment.

Unlike the intraoral scanner shown in FIGS. 5 and 6, an intraoral scanner 700 shown in FIG. 7 may have a structure in which a tip 720 is inserted into a main body 710 and coupled to the main body 710. That is, an inner wall of the main body 710 and an outer wall of the tip 720 may face and be coupled to each other.

In an embodiment, a sensor may be mounted on the main body 710. The sensor may be mounted on the inner wall of the main body 710. The sensor may be arranged in an upper area or a lower area inside the main body 710.

Alternatively, the sensor may be mounted on a side facing the tip 720 where the main body 710 and the tip 720 are engaged with each other. In an embodiment, the tip 720 may be rotated while being coupled to the main body 710. For example, each area where the tip 720 and the main body 710 are fastened may be manufactured in a cylindrical shape. The tip 720 may be rotated while being coupled to the main body 710.

In another embodiment, as in the structure shown in FIGS. 5 and 6, the intraoral scanner may have a structure in which the main body 710 is inserted into the tip 720 and coupled to the tip 720. In this case, the tip 720 may cover the main body 710 and be rotated by being coupled to the main body 710 in a cylindrical shape from the outside of the main body 710.

In an embodiment, a user may manually rotate the tip 720 by turning the tip 720 coupled to the main body 710.

In an embodiment, the main body 710 may further include a rotation member that is rotatable, such that the tip 720 may also be coupled to a rotation member of the main body 710. The user may rotate the rotation member by using a user interface (not shown), such as a control button, mounted on the main body 710, and thus may cause the tip 720 mounted on the rotation member to be rotated together.

Alternatively, the main body 710 is linked to the data processing apparatus, and accordingly, the rotation member may be rotated under control by the data processing apparatus. In more detail, the main body 710 may allow a fastening direction of the tip 720 to be adjusted, by rotating the rotation member according to a scan mode set by the data processing apparatus. For example, in a state in which the tip 720 is coupled to the rotation member included in the main body 710, and the top of the tip 720 and the top of the main body 710 are coupled in the same direction, when the user sets a scan mode to a mandibular scan mode by using the data processing apparatus, the main body 710 is linked to the data processing apparatus and rotates the rotation member by 180 degrees, such that the bottom of the tip 720 is in the same direction as the top of the main body 710, thereby allowing the mandible to be easily scanned.

Alternatively, when the rotation member of the main body 710 is rotated, the main body 710 may sense the fastening direction of the tip 720 according to a rotation angle of the rotation member, and transmit the fastening direction or a scan mode according to the fastening direction to the data processing apparatus. The data processing apparatus may identify a scan mode according to the fastening direction of the tip 720 and obtain an image in the identified scan mode.

In an embodiment, the tip 720 may include a plurality of protrusions. For example, the plurality of protrusion may protrude in a sawtooth shape. An area of the main body 710 coupled to the tip 720 may have a rotatable structure in engagement with the protrusions of the tip 720.

The sensor mounted on the main body 710 may identify one of the plurality of protrusions formed in the tip 720 according to the rotation of the tip 720. That is, the sensor may identify a protrusion positioned over the sensor or close to the front of the sensor according to the rotation, among the plurality of protrusions.

In an embodiment, the plurality of protrusions included in the tip 720 may have different thicknesses or colors according to positions of the protrusions. For example, a protrusion positioned at the upper end of the tip 720, a protrusion positioned at the lower end of the tip 720, and a protrusion positioned on the side surface of the tip 720 may have different thicknesses or different colors.

In an embodiment, the plurality of protrusions included in the tip 720 may have different thicknesses or colors according to whether the tip 720 has a general size or small size. For example, a thickness or color of a protrusion included in the tip 720 having a general size may be different from a thickness or color of a protrusion included in the tip 720 having a small size.

The sensor may sense a distance between the sensor and the protrusion by using a thickness of the protrusion, or may sense a color of the protrusion. The sensor may identify at least one of the fastening direction or size of the tip 720 by using sensed information.

The sensor may identify whenever the tip 720 is rotated once. Whenever the tip 720 is rotated once, the main body 710 may notify the user that one rotational motion has ended, by using vibration, sound, or light.

As described above, according to an embodiment, the tip 720 may be rotated while being coupled to the main body 710. The main body 710 may be linked to the data processing apparatus and allow the tip 720 to be automatically rotated according to a mode set by the data processing apparatus. Alternatively, the data processing apparatus may obtain an image in a certain scan mode, according to the fastening direction of the tip 720 based on a degree of rotation of the rotation member of the main body 710.

Also, according to an embodiment, the tip 720 may include a plurality of protrusions having different colors or thicknesses. The sensor may identify the size or fastening direction of the tip 720 by identifying a color or thickness of one of the plurality of protrusions included in the tip 720.

Figure 8:
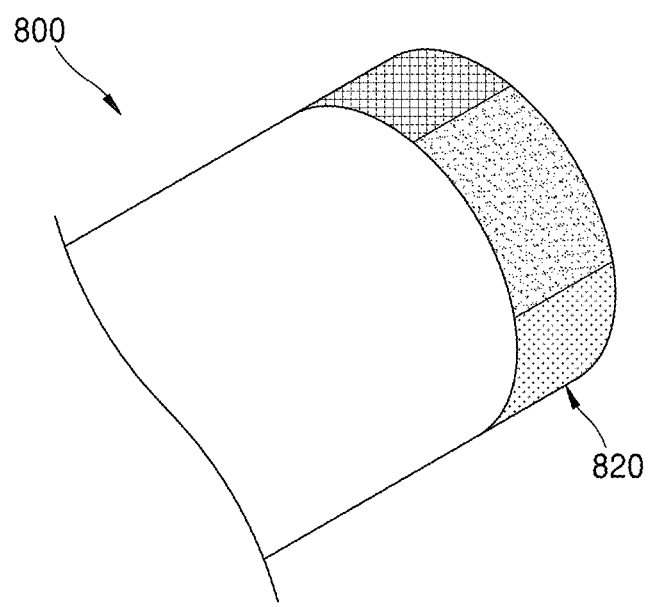
FIG. 8 is a diagram illustrating a case in which a surface color is different for each size or position of a tip, according to an embodiment.

FIG. 8 is a diagram illustrating a case in which a surface color is different for each size or position of a tip, according to an embodiment.

As in the tip 720 shown in FIG. 7, a tip 800 shown in FIG. 8 may have a structure in which the tip 800 is inserted into a main body and coupled to the main body. That is, an outer wall 820 of the tip 800 may face and be coupled to an inner wall of the main body.

In an embodiment, the outer wall 820 of the tip 800 may have a different surface color according to the direction. That is, the top, bottom, and side surface of the outer wall 820 of the tip 800 may have different colors. In this case, in an embodiment, a sensor mounted on the main body may sense a fastening direction of the tip 800 according to a surface color of the outer wall 820.

In an embodiment, the outer wall 820 of the tip 800 may have a different surface color according to whether the tip 800 is a general-sized tip or a small-sized tip.

In an embodiment, the outer wall 820 of the tip 800 may have a different color for each size of the tip 800 and for each direction of the tip 800. That is, the outer wall 820 in upward, downward, and lateral directions of the tip 800 having a general size, and the outer wall 820 in upward, downward, and lateral directions of the tip 800 having a small size may have different colors.

In an embodiment, the sensor may sense the color of the outer wall 820 of the tip 800, and detect, by using the sensed color, whether the tip 800 has a general size and the top thereof is fastened, or whether the tip 800 has a small size and the bottom thereof is fastened.

In another embodiment, the tip 800 may have a structure coupled to the main body outside the main body. That is, an inner wall of the tip 800 may face and be coupled to an outer wall of the main body. A sensor may be mounted on the outer wall of the main body. In this case, a surface color of the inner wall of the tip 800 may be different for each direction or size.

As described above, according to an embodiment, the outer wall 820 or the inner wall of the tip 800 may have a different color for each size or fastening direction.

According to an embodiment, the sensor may identify at least one of the size and fastening direction of the tip 800, by sensing a surface color of the tip 800.

Figure 9:
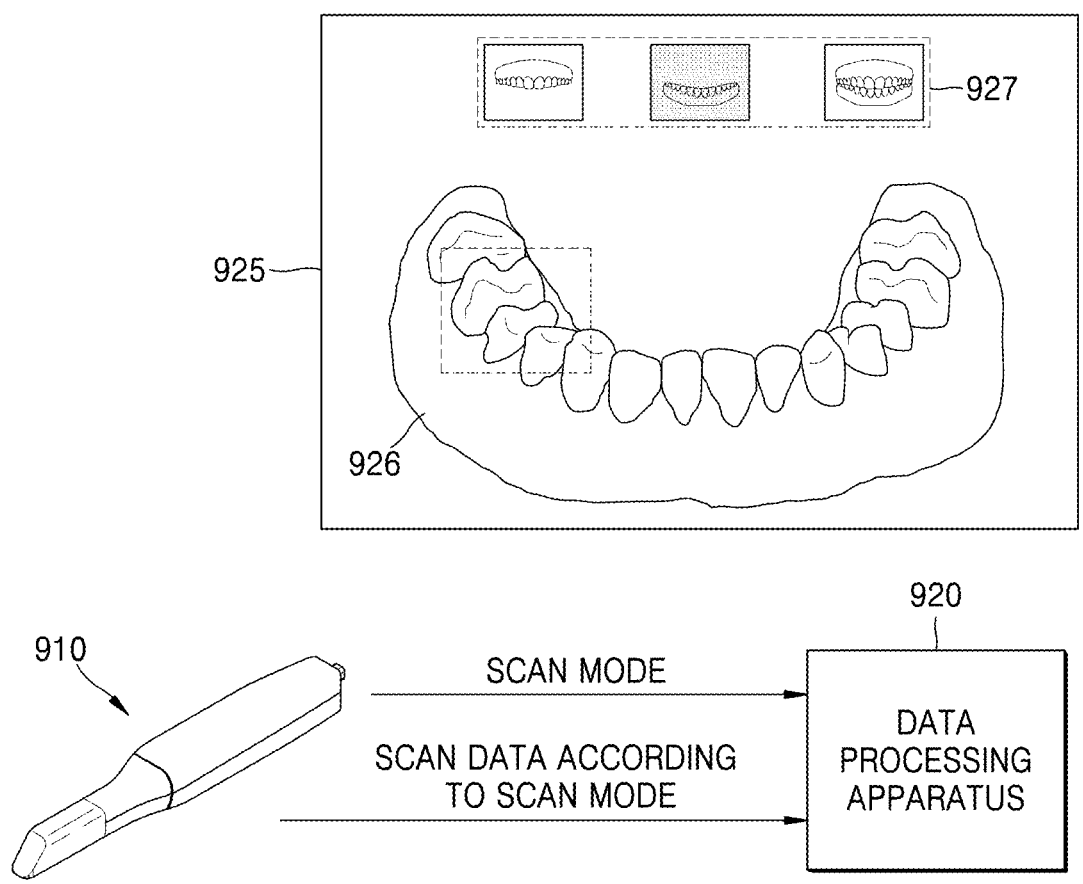
FIG. 9 is a diagram for describing that an intraoral scanner identifies a scan mode and transmits the scan mode to a data processing apparatus, according to an embodiment.

FIG. 9 is a diagram for describing that an intraoral scanner identifies a scan mode and transmits the scan mode to a data processing apparatus, according to an embodiment.

Referring to FIG. 9, an intraoral scanner 910 may transmit or receive information to or from a data processing apparatus 920.

In an embodiment, the intraoral scanner 910 may sense a tip coupled to a main body by using a sensor mounted on the main body. The intraoral scanner 910 may identify an oral image obtainment mode based on tip information obtained through the sensor. In an embodiment, the sensor may obtain tip information based on at least one of a distance from the sensor to a wall of the tip and a color of the wall.

In an embodiment, the intraoral scanner 910 may also obtain tip information by using two-dimensional image data obtained using a camera mounted on the main body, together with or separately from obtaining the tip information through the sensor. The intraoral scanner 910 may also obtain tip information by detecting a mirror area of a mirror mounted in the tip from the two-dimensional image data.

The tip information may include at least one of a fastening direction of the tip and a size of the tip.

In an embodiment, when the tip information includes the fastening direction of the tip, the intraoral scanner 910 may identify a scan mode according to the fastening direction of the tip. That is, when the tip is fastened to the main body, the intraoral scanner 910 may identify different scan modes according to whether the fastening direction is an upward, downward, or lateral direction of the tip.

For example, the fastening direction of the tip is an upward direction, that is, when the top of the tip is in the same direction as the top of the main body, the intraoral scanner 910 may identify a maxillary scan mode. When the fastening direction of the tip is a lateral direction, such as to the left or right of the tip, the intraoral scanner 910 may identify an occlusal scan mode.

The intraoral scanner 910 may transmit the identified scan mode to the data processing apparatus 920. Also, the intraoral scanner 910 may transmit, to the data processing apparatus 920, two-dimensional image data obtained by scanning the oral cavity of a patient. A two-dimensional image obtained by the intraoral scanner 910 may be an image according to the identified scan mode. For example when the top of the tip is fastened to the main body, a user may obtain data about maxilla of the patient by scanning the maxilla using the intraoral scanner 910. The intraoral scanner 910 may transmit the data about the maxilla to the data processing apparatus 920.

In an embodiment, the data processing apparatus 920 may receive a scan mode from the intraoral scanner 910 and process an image accordingly. For example, when the scan mode received from the intraoral scanner 910 is the maxillary scan mode, the data processing apparatus 920 may identify that data transmitted from the intraoral scanner 910 is maxillary scan data for generating a maxillary image, and may generate a three-dimensional virtual model of the maxilla by using the transmitted data.

The data processing apparatus 920 may output, through a display 925, a scan mode menu 927 indicating a part of an object currently being scanned to the user. The scan mode menu 927 may include information indicating whether the object being scanned is maxilla, mandible, or occlusion of the oral cavity.

In an embodiment, the data processing apparatus 920 may display and output the scan mode received from the intraoral scanner 910 on the scan mode menu 927. For example, when the scan mode transmitted from the intraoral scanner 910 is a mandibular scan mode, the data processing apparatus 920 may highlight and display the mandibular scan mode in the scan mode menu 927.

In an embodiment, the data processing apparatus 920 may obtain a three-dimensional image 926 suitable for the identified scan mode, by using raw data received from the intraoral scanner 910. That is, when the identified scan mode is the mandibular scan mode, the data processing apparatus 920 may obtain the three-dimensional image 926 suitable for the mandibular scan mode by using the raw data received from the intraoral scanner 910, and output the three-dimensional image 926 through the display 925.

In an embodiment, the intraoral scanner 910 may also obtain the three-dimensional image 926 according to the identified scan mode, by using the two-dimensional image data obtained by scanning the oral cavity of the patient. The intraoral scanner 910 may transmit the scan mode and the obtained three-dimensional image 926 to the data processing apparatus 920. The data processing apparatus 920 may output, on the display 925, the scan mode and the three-dimensional image 926 received from the intraoral scanner 910.

Although FIG. 9 shows a case in which the intraoral scanner 910 transmits the scan mode to the data processing apparatus 920, in another embodiment, the data processing apparatus 920 may also transmit the scan mode to the intraoral scanner 910.

For example, a user may select an object to be scanned, to be generated using scan data, by using a user interface screen output through the display 925 of the data processing apparatus 920. That is, the user may select whether an image to be generated using the raw data is a maxillary image, mandibular image, or occlusal image of the oral cavity, by using the scan mode menu 927 shown in the display 925 of FIG. 9.

In an embodiment, the data processing apparatus 920 may transmit, to the intraoral scanner 910, a scan mode selected by the user in the scan mode menu 927. The intraoral scanner 910 may adjust a direction of the tip coupled to the main body according to the scan mode received from the data processing apparatus 920. For example, when the top of the tip is currently fastened to the main body, and the scan mode received from the data processing apparatus 920 is an occlusal scan mode, the intraoral scanner 910 may automatically rotate the fastening direction of the tip, or inform the user that the fastening direction of the tip needs to be rotated, by using light, sound or an image, such that the side surface of the tip is fastened to the main body.

As described above, according to an embodiment, the intraoral scanner 910 and the data processing apparatus 920 may link the fastening direction of the tip with the scan mode, such that the scan mode is automatically set according to the fastening direction of the tip. Accordingly, the user may avoid the inconvenience of inputting the scan mode by operating the data processing apparatus 920 while scanning the oral cavity by using the intraoral scanner 910, or re-adjusting the fastening direction of the tip according to the scan mode after the scan mode is set by the data processing apparatus 920.

Figure 10:
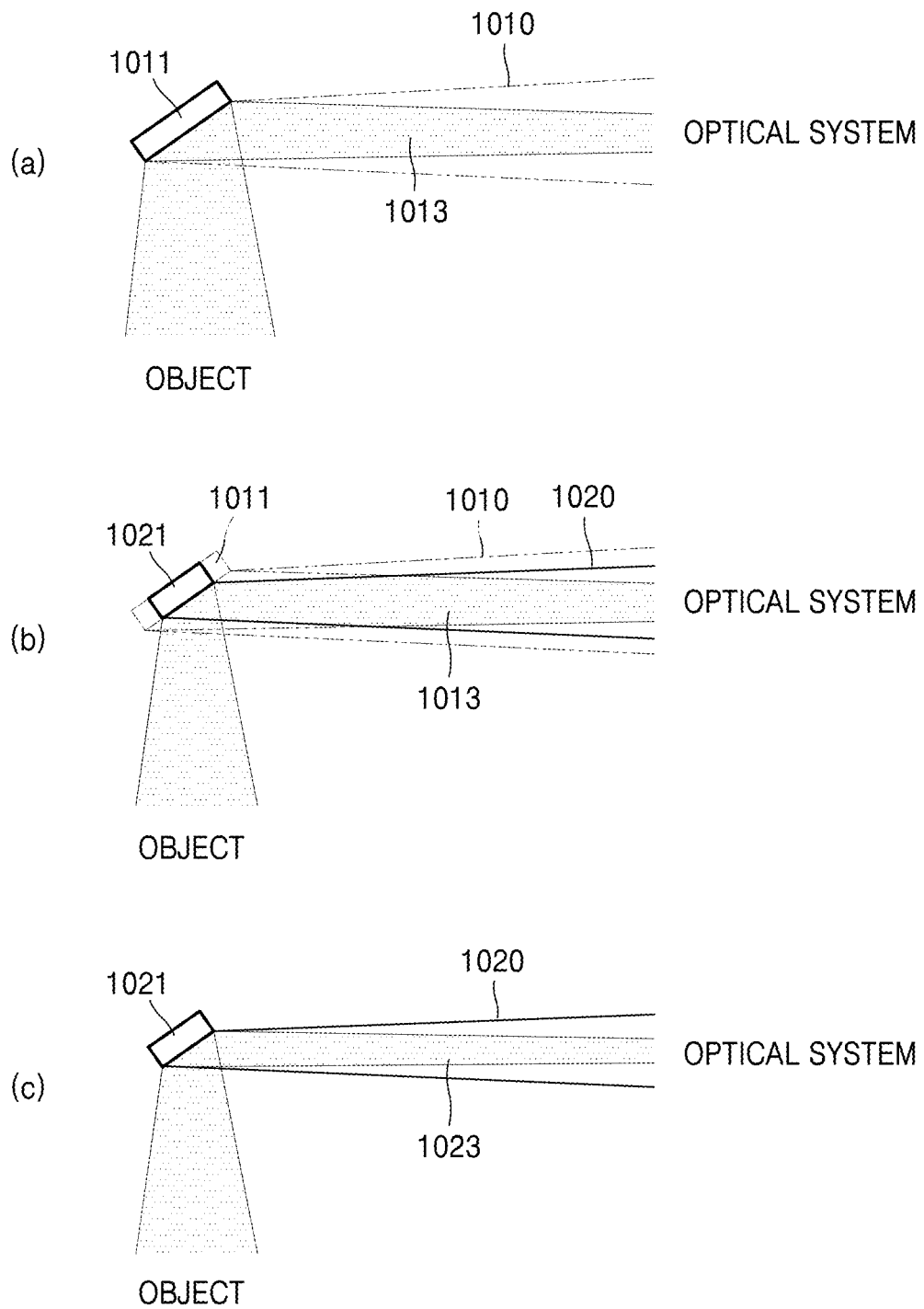
FIG. 10 is a diagram for describing that, when a tip has a small size, an intraoral scanner operates in a small projection mode, according to an embodiment.

FIG. 10 is a diagram for describing that, when a tip has a small size, an intraoral scanner operates in a small projection mode, according to an embodiment.

In an embodiment, the tip may be classified into a general-sized tip and a small-sized tip, according to a size of the tip. The small-sized tip may be a tip in which widths of both the tip and a mirror mounted in the tip are smaller than those of the general-sized tip.

A projection area from which an optical system of the intraoral scanner projects light may be a preset area. Accordingly, when the optical system of the intraoral scanner is not adjusted, the intraoral scanner may project light from a preset basic projection area. Hereinafter, for convenience of description, a basic projection area determined by the optical system of the intraoral scanner is referred to as a first projection area.

In an embodiment, when the tip is the general-sized tip, the intraoral scanner may project light from the first projection area.

(a) of FIG. 10 is a diagram for describing an optical path of light projected by an optical system of the intraoral scanner when a tip 1010 has a general size. In (a) of FIG. 10, light projected by the optical system of the intraoral scanner from the first projection area is reflected by a mirror 1011 of the tip 1010 and projected onto an object through an opening of the tip 1010.

(b) of FIG. 10 shows a case in which, when a tip 1020 has a small size, light is projected from the first projection area in the same manner as in (a) of FIG. 10. As shown in (b) of FIG. 10, a size of a mirror 1021 included in the small-sized tip 1020 is less than that of the mirror 1011 included in the general-sized tip 1010.

Even though the tip 1020 has a small size, when the intraoral scanner projects light to the same area as when light is projected to the general-sized tip 1010, a part of projected light 1013 collides with an inner wall of the small-sized tip 1020 rather than the mirror 1011, and causes diffuse reflection. The light that has collided with the inner wall is added to a lens of a camera in the main body as noise. In this case, because noise due to diffusely reflected light is added to an image obtained by the camera in the main body, accurate scan data is unable to be obtained. Also, because the data processing apparatus generates a three-dimensional virtual model including noise, an accurate three-dimensional virtual model is unable to be generated.

In an embodiment, the intraoral scanner may identify the size of the tip by using the image obtained using the camera.

For example, when light having an area suitable for the general-sized tip 1010 is projected even though the tip 1020 is a small-sized tip, a part of the projected light is reflected by the mirror 1021 of the small-sized tip 1020 and projected onto the object, and the light projected onto the object is obtained as an image through the camera. Other parts of the light cause diffuse reflection on a wall without colliding with the mirror 1021, and return to the lens of the camera.

In an embodiment, the intraoral scanner may identify an area of image data obtained for the object, that is, a mirror area, from other areas in the two-dimensional image data obtained using the camera. Accordingly, the intraoral scanner may identify whether the tip is a small-sized tip or general-sized tip.

In an embodiment, the intraoral scanner may identify the size of the tip through a sensor, or identify the size of the tip from image data obtained through the camera, and when the identified size of the tip is a small size, may operate in the small projection mode accordingly. In the small projection mode, the intraoral scanner may adjust the projection area from the first projection area to a second projection area. A size of the second projection area may be less than a size of the first projection area.

(c) of FIG. 10 shows an optical path in a case in which the intraoral scanner adjusts the projection area according to the small projection mode when the tip 1020 has a small size. In (c) of FIG. 10, the intraoral scanner may project light 1023 of a reduced area by reducing the projection area to the second projection area. The light 1023 emitted from the second projection area is all projected to the mirror 1021 without colliding with an inner wall of the small-sized tip 1020, reflected from the mirror 1021, and directed to the object.

As described above, according to an embodiment, when it is identified that the tip has a small size, the intraoral scanner may obtain accurate scan data by reducing the projection area accordingly.

Figure 11:
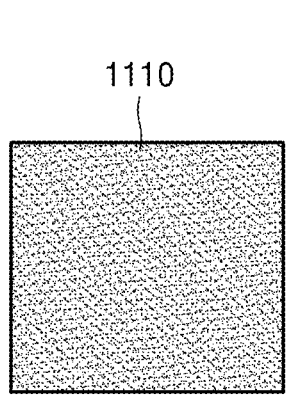
FIG. 11 is a diagram for describing a method of obtaining tip information from two-dimensional image data and detecting a projection area based on the tip information, according to an embodiment.
Figure 11:
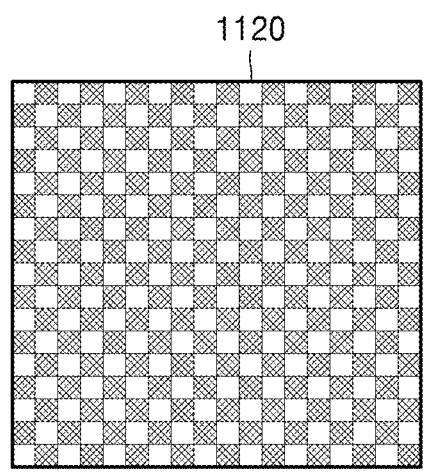
Figure 11:
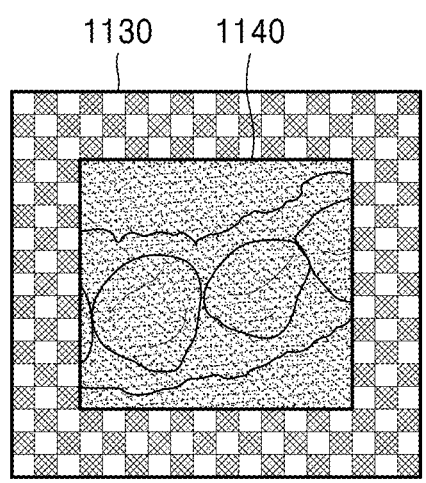
Figure 11:
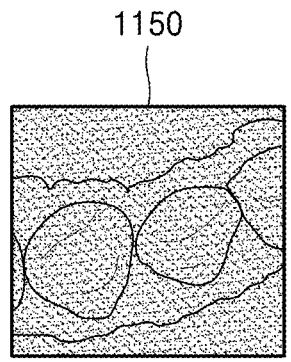

FIG. 11 is a diagram for describing a method of obtaining tip information from two-dimensional image data and detecting a projection area based on the tip information, according to an embodiment.

In an embodiment, the intraoral scanner may obtain information about a size of a tip from two-dimensional image data obtained through a camera.

(a) of FIG. 11 shows a mirror 1110 included in a small-sized tip. A size of the mirror 1110 included in the small-sized tip is less than that of a mirror included in a general-sized tip.

(b) of FIG. 11 shows a basic projection area 1120 to which a projector of the intraoral scanner projects light. The basic projection area 1120 may be a projection area set to fit a general-sized tip. The basic projection area 1120 may be an area having a preset size. When a tip mounted on a main body of the intraoral scanner has a general size, the intraoral scanner may project light from the preset basic projection area 1120. The camera of the intraoral scanner may obtain an image of an object as a basic scan ROI.

When the small-sized tip is mounted on the intraoral scanner, but the intraoral scanner projects light from the basic projection area 1120, an area of the projected light is greater than that of the mirror 1110 of the small-sized tip. Accordingly, a part of the projected light is reflected by the mirror 1110 included in the small-sized tip and projected onto the object, but other parts of the light collide with an inner wall of the tip and cause diffuse reflection.

The camera of the intraoral scanner may obtain an image from the light projected onto the object by the mirror 1110 included in the small-sized tip.

(c) of FIG. 11 shows image data 1130 obtained by the camera as a basic scan ROI. The image data 1130 obtained as the basic scan ROI may include an image area 1140 of the object, obtained by the mirror 1110 included in the small-sized tip, together with an area obtained as light emitted by the projector causes diffuse reflection on the wall and returns to the lens of the camera.

In an embodiment, the intraoral scanner may identify the image area 1140 obtained for the object from other areas in the image data 1130 obtained as the basic scan ROI.

In an embodiment, the intraoral scanner may use light having a certain pattern to more easily identify the image area 1140 obtained for the object from other parts in the image data 1130 obtained as the basic scan ROI. For example, the intraoral scanner may use light having a grid pattern as shown in (b) of FIG. 11, but this is merely an embodiment, and light having various patterns that are easy to identify between areas may be used.

Even when the small-sized tip is mounted on the main body of the intraoral scanner, in a case in which the intraoral scanner emits light having a certain pattern from the basic projection area 1120, a part of the emitted light having a certain pattern collides with the wall of the small-sized tip and is incident again on the lens of the camera, such that the incident light maintains an original certain pattern.

Light that has collided with the mirror 1110 of the small-sized tip in the light having a certain pattern emitted by the intraoral scanner is projected onto the object, and the light projected onto the object is obtained as an image through the camera inside the intraoral scanner. In this regard, the image obtained through the camera may be a captured image of the object. In this case, in the image obtained using the camera, a pattern included in the projected light is hardly visible. Accordingly, the intraoral scanner may identify an area including a certain pattern from an area in which the certain pattern is hardly visible, that is, the image area 1140 obtained for the object, among the image data 1130 obtained as the basic scan ROI. The intraoral scanner may identify a size of the image area 1140 obtained for the object, in which the certain pattern is hardly visible.

The intraoral scanner may identify the size of the image area 1140 obtained for the object, in which the certain pattern is not visible. For example, the intraoral scanner may identify the number of grid patterns that fit a horizontal or vertical size of the image area 1140 obtained for the object, and identify the size of the image area 1140 obtained for the object according to the identified number of grid patterns. The intraoral scanner may identify that the tip mounted on the main body of the intraoral scanner is a small-sized tip, in response to the size of the image area obtained for the object being smaller than an image having the basic scan ROI by a certain reference value or more.

In an embodiment, the intraoral scanner may also transmit the image data obtained as the basic scan ROI to the data processing apparatus. For example, the intraoral scanner may transmit the image data as shown in (c) of FIG. 11 to the data processing apparatus.

In this case, the data processing apparatus may receive the image data from the intraoral scanner, and identify the image area 1140 obtained for the object therefrom.

The data processing apparatus may identify the number of grid patterns corresponding to a mirror area included in the image data, and it may be seen that the size of the tip is different from that according to a current projection mode, by using the number of grid patterns. The data processing apparatus may identify a projection mode suitable for the size of the tip, generate control information according to the identified projection mode, transmit the control information to the intraoral scanner, and control the intraoral scanner to operate in the projection mode according to the control information.

Alternatively, the data processing apparatus may obtain a three-dimensional oral image by cutting only an area corresponding to the identified image area 1140, among the image data received from the intraoral scanner, and using only the area as raw data.

In an embodiment, when the control information is received from the data processing apparatus, the intraoral scanner may adjust the projection mode according to the control information. Alternatively, when it is identified that the size of the tip is not suitable for the current projection mode, the intraoral scanner may also automatically operate in a projection mode suitable for the size of the tip.

For example, when the size of the tip is small, the intraoral scanner may reduce the projection area from the first projection area to the second projection area, by adjusting the projection mode to the small projection mode. Sizes of the first projection area and the second projection area may be pre-stored in the intraoral scanner as preset values.

In another embodiment, when the size of the tip is not suitable for the current projection mode, the intraoral scanner may directly detect a projection area suitable for the tip.

A width or length of the tip, a position or angle at which the mirror is mounted, etc., may be preset. However, because the tip is formed by combining several components, there may be an error within an allowable range for dimensions determined by design. Also, because the tip has a detachable structure rather than a structure fixed to the main body of the intraoral scanner due to characteristics thereof, there may be a tolerance according to whether a degree that the tip is attached to or detached from main body is loose or hard.

Accordingly, in an embodiment, when the size of the mounted tip is different from a size according to the current projection mode, the intraoral scanner may directly detect and use a new projection area according to the mounted tip.

In an embodiment, the intraoral scanner may detect a projection area suitable for a tip whenever a new tip is mounted.

In an embodiment, when it is identified that the tip mounted on the intraoral scanner has a small size, the intraoral scanner may identify an area including a certain pattern and an area in which the pattern is hardly visible, in the image data 1130 obtained as the basic scan ROI of the camera, detect the image area 1140 of the object, and obtain a second projection area corresponding to the detected image area 1140. The intraoral scanner may project light to the mirror 1110 of the small-sized tip, from the second projection area. In this case, the projected light may be patterned light having a pattern different from the certain pattern.

The intraoral scanner may also obtain a second ROI corresponding to the second projection area. The intraoral scanner may obtain an image as a reduced scan ROI, that is, the second ROI of the object. (d) of FIG. 11 shows image data 1150 obtained by the intraoral scanner projecting light from the second projection area and the camera of the intraoral scanner obtaining the projected light as the second ROI. Referring to (d) of FIG. 11, it may be seen that the image data 1150 obtained as the second ROI includes only image data corresponding to a mirror of the small-sized tip without unnecessary data.

For convenience of description, although it is shown in FIG. 11 that the image data area 1140 has a square shape, the disclosure is not limited thereto. The image data area 1140 may have a rectangular shape with different upper and lower lengths. This will be described in detail with reference to FIG. 12.

In an embodiment, FIG. 11 has been described with a case in which the tip mounted on the intraoral scanner has a small size as an example, but the disclosure of the present application is not limited thereto.

In an embodiment, the tip may have a plurality of various sizes, for example, large, small, and medium sizes. In this case, the intraoral scanner may be configured such that a projection area has an area corresponding to a size of a mirror larger than a mirror mounted in a large-sized tip, and an ROI of the camera also has a size corresponding to the size of the mirror larger than the mirror mounted in the large-sized tip.

The intraoral scanner may identify the size of the tip mounted on the intraoral scanner by identifying an image area of the object from the image data obtained using the camera. The intraoral scanner may identify a size of the image area of the object included in the image data, and identify the size of the tip according to which range the identified size of the image area falls within. For example, the intraoral scanner may identify that the tip is a small-sized tip when the identified size of the image area is less than a first reference size, identify that the tip is a medium-sized tip when the size of the image area is greater than the first reference size and less than a second reference size, and identify that the tip is a large-sized tip when the identified size of the image area is greater than the second reference size.

In an embodiment, the intraoral scanner may adjust a projection area and an ROI of the camera according to the identified size of the tip. For example, when the identified tip is a large-sized tip, the intraoral scanner may adjust the projection area to have an area corresponding to a mirror mounted in the large-sized tip. Also, the intraoral scanner may adjust the ROI of the camera to fit an ROI of the large-sized tip.

As described above, according to an embodiment, the intraoral scanner may identify the size of the tip mounted on the main body by using two-dimensional image data scanned by the camera.

Also, the intraoral scanner may more accurately identify the size of the tip mounted on the main body by projecting, from a basic projection area, light having a certain pattern that is easy to identify.

In addition, the intraoral scanner may adjust the projection area and the scan ROI according to the size of the mirror included in the small-sized tip, and obtain two-dimensional image data by using the adjusted projection area and scan ROI.

Figure 12:
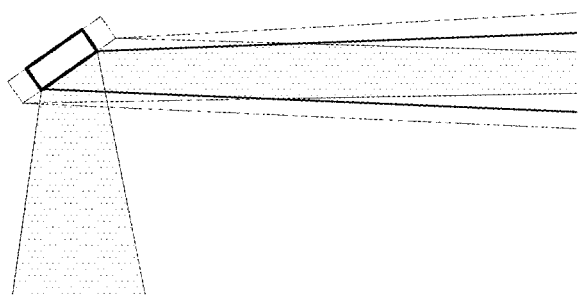
FIG. 12 is a diagram for describing that tip information is obtained from two-dimensional image data, according to an embodiment.
Figure 12:
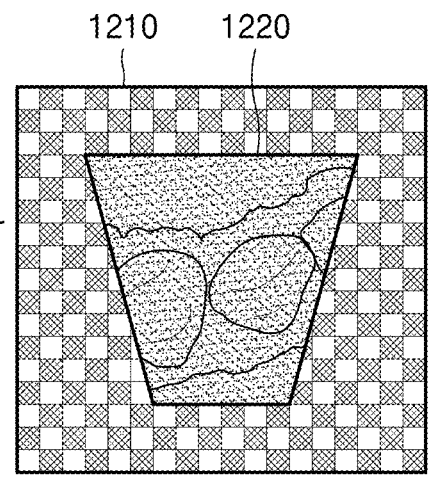
Figure 12:
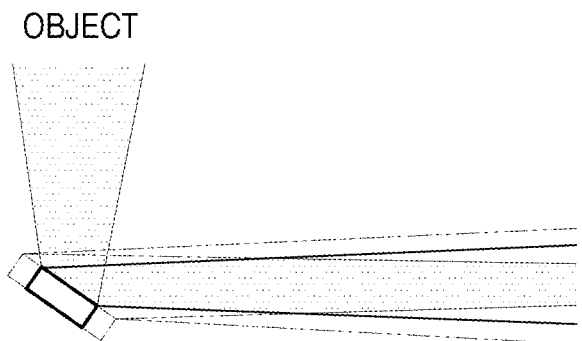
Figure 12:
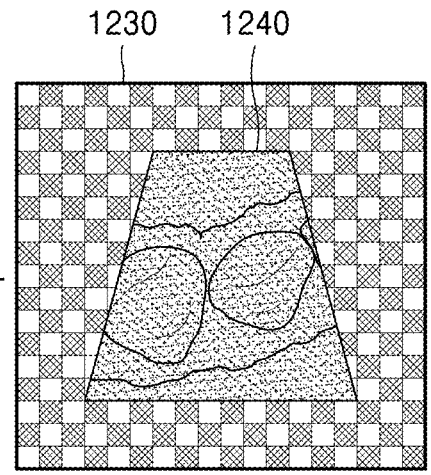

FIG. 12 is a diagram for describing that tip information is obtained from two-dimensional image data, according to an embodiment.

(a) of FIG. 12 shows a case in which the intraoral scanner projects light from a general projection area even though a tip mounted on the intraoral scanner has a small size. A size of a mirror included in a small-sized tip is less than a size of a mirror included in a general-sized tip, and upper and lower widths of the small-sized tip are also less than those of the general-sized tip. Even though the tip has a small size, when the intraoral scanner projects light to the same area as when light is projected to the general-sized tip, a part of the projected light collides with an inner wall of the small-sized tip rather than the mirror, causes diffuse reflection, and is added to a lens of a camera as noise.

Also, (a) of FIG. 12 shows that the top of the tip is engaged with the top of a main body of the intraoral scanner and coupled in a forward direction.

(b) of FIG. 12 shows image data 1210 obtained by the camera as a basic scan ROI when light is projected from the general projection area even though the small-sized tip is mounted as shown in (a) of FIG. 12. The image data 1210 obtained as the basic scan ROI may include an image area 1220 of an object, obtained by the mirror included in the small-sized tip, together with an area obtained as light emitted by a projector causes diffuse reflection on a wall and returns to the lens of the camera.

The intraoral scanner and/or the data processing apparatus that has received two-dimensional image data from the intraoral scanner may identify that the tip coupled to the main body of the intraoral scanner is a small-sized tip, in response to a size of the image area 1220 obtained for the object being less than that of the image data 1210 having the basic scan ROI by a certain reference value or more.

Moreover, the mirror mounted in the tip is mounted in the tip while being inclined by a certain angle to change an optical path. Because the mirror changes the optical path such that light emitted from the projector is projected toward the object, and changes the optical path such that light reflected from the object and incident through an opening of the tip is directed to the lens of the camera, the mirror is mounted in the tip while being inclined to have a certain angle different from a direction of the light emitted from the projector and a direction of the light incident from the object. Accordingly, a distance from the camera to the upper end of the mirror and a distance from the camera to the lower end of the mirror are different from each other. That is, the distance from the camera to the upper end of the mirror is shorter than the distance from the camera to the lower end of the mirror. In this case, as shown in (a) of FIG. 12, when the light is projected from the general projection area while the small-sized tip is mounted, and the image data 1210 is obtained as the basic scan ROI, the image area 1220 of the object included in the image data 1210 has a shape in which the upper end of the image area 1220 is longer than the lower end thereof, as shown in (b) of FIG. 12.

In an embodiment, the intraoral scanner and/or the data processing apparatus that has received the image data 1210 from the intraoral scanner may identify a mirror area by detecting the image area 1220 of the object from the image data 1210. The intraoral scanner may identify a fastening direction of the tip based on the shape of the image area 1220 of the object. As shown in (b) of FIG. 12, in response to the number of grid patterns corresponding to the upper end of the image area 1220 being greater than the number of grid patterns corresponding to the lower end thereof, the intraoral scanner and/or the data processing apparatus may identify that the upper end of the image area 1220 is longer.

When the upper end of the image area 1220 is longer, the intraoral scanner and/or the data processing apparatus may identify that the tip is mounted in a forward direction.

(c) of FIG. 12 shows a case in which the intraoral scanner projects light from the general projection area even though the tip mounted on the intraoral scanner has a small size, as in (a) of FIG. 12. However, because (c) of FIG. 12 shows that the bottom of the tip is engaged with the top of the main body of the intraoral scanner and coupled thereto in a reverse direction, (c) of FIG. 12 is identified from (a) of FIG. 12 in which the bottom of the tip is coupled to the top of the main body in a forward direction.

(d) of FIG. 12 shows image data 1230 obtained by the camera as a basic scan ROI when light is projected from the general projection area even though the small-sized tip is mounted as shown in (c) of FIG. 12. The image data 1230 obtained as the basic scan ROI may include an image area 1240 of the object, obtained by the mirror included in the tip, together with an area obtained as light that has caused diffuse reflection on the wall returns to the lens of the camera.

In an embodiment, the intraoral scanner and/or the data processing apparatus that has received the image data 1230 from the intraoral scanner may identify a length of each of the upper end and the lower end of the image area 1240 of the object included in the image data 1230. For example, the intraoral scanner and/or the data processing apparatus may identify the number of grid patterns corresponding to the lengths of the upper and lower ends of the image area 1240, identify each of the lengths of the upper and lower ends of the image area 1240 according to the identified number of grid patterns, and identify that which of the upper and lower ends is longer.

The intraoral scanner and/or the data processing apparatus may identify that the small-sized tip coupled to the main body of the intraoral scanner is mounted on the intraoral scanner in a reverse direction, in response to the length of the lower end of the image area 1240 being greater than that of the upper end thereof.

In an embodiment, the intraoral scanner and/or the data processing apparatus may identify a direction of an image area of the object from image data. The intraoral scanner and/or the data processing apparatus may identify lengths of the upper and lower ends of the image area, and accordingly identify whether a tip is mounted in a forward direction or a reverse direction. In an embodiment, the intraoral scanner and/or the data processing apparatus may identify a scan mode according to the identified direction of the tip and process the image data according to the identified scan mode.

As described above, according to an embodiment, the intraoral scanner and/or the data processing apparatus may identify a size and direction of the tip mounted on the main body by using two-dimensional image data scanned using the camera.

Figure 13:
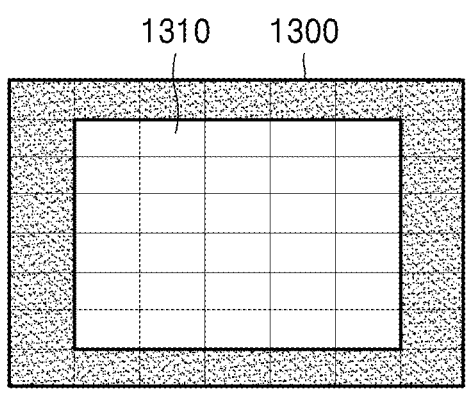
FIG. 13 is a diagram for describing that a size of a projection area and a size of a scan region of interest of a camera are controlled in a small projection mode, according to an embodiment.
Figure 13:
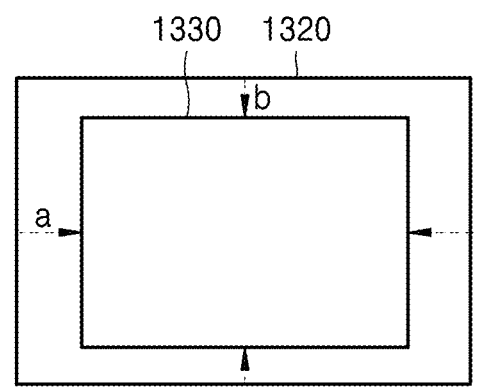

FIG. 13 is a diagram for describing that a size of a projection area and a size of a scan ROI of a camera are controlled in a small projection mode, according to an embodiment.

The intraoral scanner may project light by using a projector. The projector of the intraoral scanner may project light with a red-green-blue (RGB) light source and control each of a plurality of mirrors included in a digital micromirror device (DMD), to form a pattern. The DMD is an aggregate of micromirrors, and tens of thousands of mirrors are arranged like a checkerboard, such that each mirror may function as a pixel. The projector may control the mirrors included in the DMD either on or off. Each mirror has a different inclination in an on state and an off state, and accordingly, light is emitted or prevented from being emitted, such that brightness may be adjusted.

In an embodiment, the intraoral scanner may identify a size of a tip and operate in different projection modes according to the identified size of the tip. The intraoral scanner may operate in the general projection mode when the size of the tip is a general size. In the general projection mode, the intraoral scanner may project light from a preset first projection area.

(a) of FIG. 13 shows a simplified view of the DMD used when the projector projects light. In an embodiment, the entire area of the DMD shown in (a) of FIG. 13 may be an area corresponding to a first projection area 1300. That is, in the general projection mode, the projector may project light by controlling all mirrors included in the entire area of the DMD to be in an on state.

In an embodiment, the intraoral scanner may operate in the small projection mode when the identified size of the tip is a small size. In the small projection mode, the intraoral scanner may reduce the first projection area to a second projection area.

In an embodiment, the second projection area may be an area determined corresponding to a size of a mirror mounted in the small-sized tip. Light projected from the second projection area may all be projected to the mirror included in the small-sized tip without colliding with a wall of the tip.

In (a) of FIG. 13, the intraoral scanner may reduce the first projection area 1300 to a second projection area 1310, to operate in the small projection mode. By controlling only mirrors included in the second projection area 1310 to be in an on state and controlling mirrors included in other areas to be in an off state, the intraoral scanner may project light by using only the mirrors in the reduced second projection area 1310 without using mirrors on the edge of the entire area of the DMD.

In the small projection mode, the intraoral scanner projects light from the second projection area, and the projected light is reflected by the mirror included in the small-sized tip and projected onto an object.

The intraoral scanner may obtain two-dimensional image data by using at least one camera for the oral cavity to which light is projected. In this case, the intraoral scanner may obtain two-dimensional image data corresponding to a scan ROI. The scan ROI is a partial area selected from an entire image and may refer to an image processing area that is actually processed for image analysis.

A size of the scan ROI may be preset. The intraoral scanner may obtain the two-dimensional image data from the preset scan ROI. Hereinafter, for convenience of description, a preset basic scan ROI is referred to as a first ROI.

When a tip mounted on a main body of the intraoral scanner has a small size, a size of a mirror included in a small-sized tip is less than that of a mirror included in a general-sized tip. Accordingly, an area of light reflected through the mirror included in the small-sized tip and incident on the object is also reduced. When an image is obtained as the preset basic scan ROI even though the tip has a small size, the image may include unnecessary data other than the object. Also, data processing speed and amount of calculations may increase due to the unnecessary data.

Accordingly, in an embodiment, when the tip has a small size, the intraoral scanner may also reduce a scan ROI of the camera and obtain an oral image only in the reduced scan ROI. In an embodiment, when the tip has a small size, the intraoral scanner may adjust the scan ROI from the first ROI to a second ROI. The second ROI may be a smaller area than the first ROI.

(b) of FIG. 13 is a diagram of a scan ROI in which the camera obtains image data. In an embodiment, the scan ROI shown in (b) of FIG. 13 may be a basic scan ROI, that is, a first ROI 1320. That is, in the general projection mode, the camera may obtain an image in the first ROI 1320. The image obtained in the first ROI 1320 may be used to generate a three-dimensional virtual model.

In an embodiment, when the identified size of the tip is a small size, the intraoral scanner may reduce the scan ROI of the camera from the first ROI 1320 to a second ROI 1330.

In an embodiment, the second ROI 1330 may be determined corresponding to the size of the mirror mounted in the small-sized tip.

In (b) of FIG. 13, the intraoral scanner may reduce the scan ROI from the first ROI 1320 to the second ROI 1330, to operate in the small projection mode. The intraoral scanner may adjust the scan ROI to the second ROI 1330 by adjusting the first ROI 1320 to the left and right along a horizontal axis by a and vertically adjusting the first ROI 1320 along a vertical axis by b. The intraoral scanner may obtain image data in the reduced second ROI 1330. The image data obtained in the second ROI 1330 may be used to generate a three-dimensional virtual model.

As described above, according to an embodiment, the intraoral scanner may operate in different projection modes according to the identified size of the tip. When the size of the tip is small, the intraoral scanner may reduce the projection area and the scan ROI to correspond to the size of the mirror of the small-sized tip, such that accurate scan data may be obtained.

Figure 14:
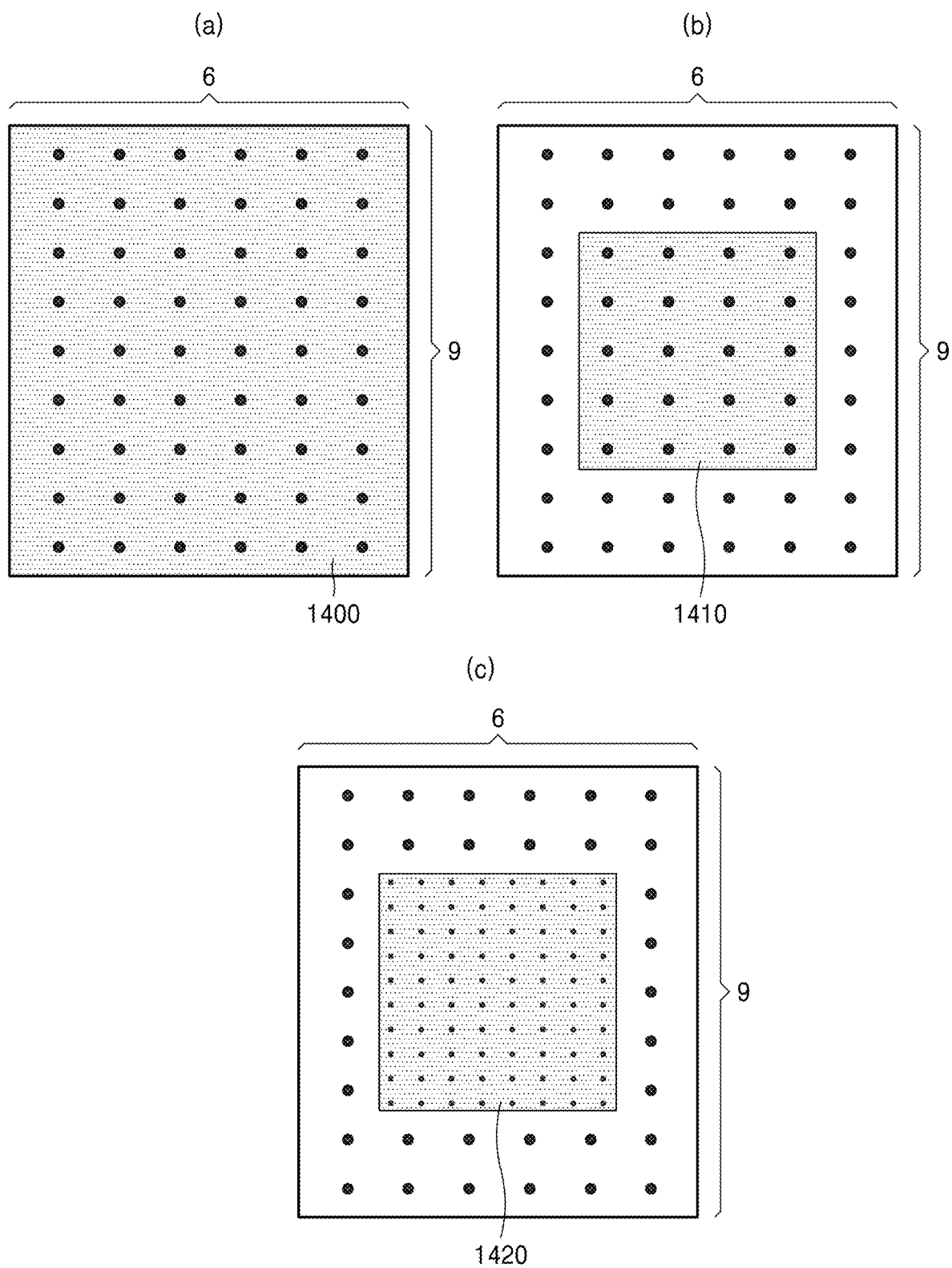
FIG. 14 is a diagram for describing scan regions of interest in different projection modes, according to an embodiment.

FIG. 14 is a diagram for describing scan ROIs in different projection modes, according to an embodiment.

(a) of FIG. 14 shows a basic scan ROI, that is, a first ROI 1400. A size of the first ROI 1400 is 6×9 in width and length, respectively, and may include 54 points. In a basic projection mode, the intraoral scanner may obtain image data in the first ROI 1400. The data processing apparatus may obtain a three-dimensional virtual model by extracting all or some of the 54 points included in the image data obtained by the intraoral scanner in the first ROI 1400.

In an embodiment, when a mounted tip has a small size, the intraoral scanner may adjust the scan ROI to a second ROI.

(b) of FIG. 14 shows a second ROI 1410. The intraoral scanner may adjust the scan ROI from the first ROI 1400 to the second ROI 1410. A size of the second ROI 1410 may be set to correspond to a size of a mirror mounted in the small-sized tip. In (b) of FIG. 14, the second ROI 1410 may have a size of 4×5 and include 20 points.

When the tip has a small size, the intraoral scanner may obtain image data in the second ROI 1410. The data processing apparatus may obtain a three-dimensional virtual model by extracting all or some of the 20 points included in the image data obtained by the intraoral scanner through the second ROI 1410.

In another embodiment, when operating in the small projection mode, the data processing apparatus may improve resolution of the adjusted scan ROI. (c) of FIG. 14 is a diagram of a second ROI 1420 with improved resolution.

The data processing apparatus may improve the resolution of the adjusted scan ROI by extracting a point having a size of 8×10 from the second ROI 1420 and using the same for data processing. The data processing apparatus may obtain more precise three-dimensional virtual model by increasing the resolution of the adjusted scan ROI.

Figure 15:
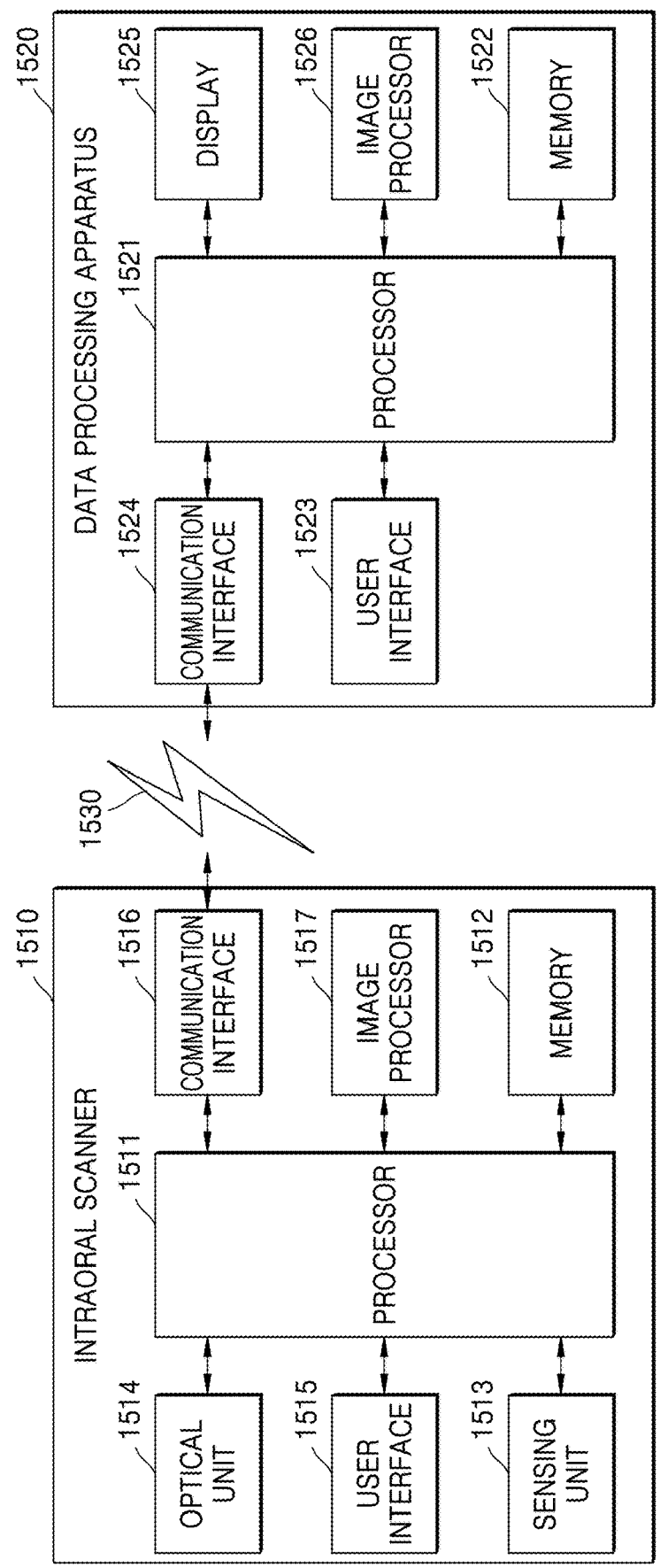
FIG. 15 shows an oral image processing system according to an embodiment.

FIG. 15 shows an oral image processing system according to an embodiment.

In an embodiment, the oral image processing system may include an intraoral scanner 1510, a data processing apparatus 1520, and a communication network 1530.

The intraoral scanner 1510 may transmit two-dimensional data obtained by scanning the oral cavity or a dental cast model of a patient to the data processing apparatus 1520 through the communication network 1530, or may generate a three-dimensional virtual model by processing two-dimensional data and transmit the three-dimensional virtual model to the data processing apparatus 1520.

The data processing apparatus 1520 may generate a three-dimensional virtual model by processing the two-dimensional data received from the intraoral scanner 1510, or may display the three-dimensional virtual model received from the intraoral scanner 1510 on a display or transmit the three-dimensional virtual model to an external apparatus.

In FIG. 15, the intraoral scanner 1510 may include a processor 1511, a memory 1512, a sensing unit 1513, an optical unit 1514, a user interface 1515, a communication interface 1516, and an image processor 1517.

The memory 1512 may include at least one instruction. Also, the memory 1512 may store at least one instruction executable by the processor. In addition, the memory may store at least one program executable by the processor 1511. Also, the memory 1512 may temporarily store two-dimensional image data obtained using a camera included in the image processor 1517 or a three-dimensional virtual model generated therefrom, to transmit the same to the data processing apparatus 1520.

In an embodiment, the memory 1512 may store an oral image obtainment mode mapped to tip information. Information about the oral image obtainment mode may be information for identifying a mode corresponding to the tip information. For example, the oral image obtainment mode may include a scan mode for each fastening direction of a tip. The fastening direction of the tip may be obtained using a sensor according to a distance from the sensor to a wall of the tip or a color of the wall of the tip, and together with or separately from this, may be obtained based on a shape of a mirror area included in the two-dimensional image data obtained using the camera. Also, the oral image obtainment mode may include a projection mode according to a size of the tip. The size of the tip may be obtained using the sensor according to the distance to the wall of the tip or the color of the wall of the tip, and together with or separately from this, may be obtained based on a size of the mirror area included in the two-dimensional image data obtained using the camera.

The sensing unit 1513 may include at least one sensor. The sensing unit 1513 may be arranged in a main body of the intraoral scanner 1510 and sense a tip coupled to the main body. The sensing unit 1513 may include at least one proximity sensor. The sensing unit 1513 may emit an electromagnetic field or electromagnetic wave, an ultrasonic wave, etc., measure an amount or a return time of light returning after an emitted signal is reflected by the tip, and identify a distance to the tip and a surface color of the tip. The sensing unit 1513 may obtain tip information about the tip by using the distance to the tip or the surface color of the tip. The tip information may include at least one of the fastening direction of the tip or the size of the tip.

The optical unit 1514 may include a light source and a projector that projects light from the light source. The optical unit 1514 may project patterned light or structured light. The optical unit 1514 project light with an RGB light source and control micromirrors included in a DMD to form a pattern. The optical unit 1514 may project light by controlling the mirrors included in the DMD to be turned on or off.

The light projected by the optical unit 1514 is projected to an opening by a mirror mounted in the tip and projected onto an object through the opening.

In an embodiment, when the size of the tip is a general size and the size of the tip is not suitable for a current projection mode, the optical unit 1514 may project light from a basic projection area, that is, a first projection area, under control by the processor 1511.

In an embodiment, when the size of the tip is a small size and the size of the tip is not suitable for the current projection mode, the optical unit 1514 may adjust the projection area to fit a small-sized tip and project light from an adjusted second projection area, under the control by the processor 1511.

In an embodiment, in order to identify the size of the tip, the optical unit 1514 may project light having a certain pattern, such as a grid pattern, that is easy to identify between areas.

The user interface 1515 may receive a user input for controlling the intraoral scanner 1510. The user interface 1515 may include a touch panel for detecting a touch of a user, a button for receiving a push operation of the user, a speech recognition apparatus including a microphone, etc.

In an embodiment, the user interface 1515 may include an input means for rotating the tip. For example, the user interface 1515 may receive a control signal for rotating the tip from the user, by using a button-type, ring-type, wheel-type, or touch pad-type means.

The communication interface 1516 may communicate with the data processing apparatus 1520 through the communication network 1530, wired or wireless. In detail, the communication interface 1516 may communicate with the data processing apparatus 1520 under the control by the processor 1511. The communication interface 1516 may transmit two-dimensional image data or an oral image obtained by the image processor 1517 to the data processing apparatus 1520.

The communication interface 1516 may include at least one short-range communication module that performs communication according to communication standards, such as Bluetooth, wireless fidelity (Wi-Fi), Bluetooth low energy (BLE), near field communication (NFC)/radio frequency identification (RFID), Wi-Fi direct, ultra-wideband (UWB), or Zigbee, a long-distance communication module that communicates with a server for supporting long-distance communication according to long-distance communication standards, and at least one port for connecting with an external electronic apparatus through a wired cable for communication by wire.

In an embodiment, when the sensing unit 1513 obtains tip information or the processor 1511 obtains tip information from the two-dimensional image data obtained by the image processor 1517, the communication interface 1516 may transmit the tip information to the data processing apparatus 1520 through the communication network 1530.

Also, the communication interface 1516 may receive control information according to a projection mode from the data processing apparatus 1520 through the communication network 1530.

The image processor 1517 may perform operations for generating and/or processing an image. The image processor 1517 may include at least one camera. The image processor 1517 may obtain two-dimensional image data by using the camera.

For example, the image processor 1517 may include an L camera corresponding to a left field of view and an R camera corresponding to a right field of view, to reconstruct a three-dimensional image according to a light triangulation method. The L camera and the R camera may obtain L image data corresponding to the left field of view and R image data corresponding to the right field of view, respectively. The image processor 1517 may perform a processing operation for data transmission, on raw data including the L image data and the R image data, and output the same to the communication interface 1516 for transmission to the data processing apparatus 1520.

Alternatively, the image processor 1517 may generate a three-dimensional virtual model by directly processing the two-dimensional image data obtained through the camera, and transmit the three-dimensional virtual model to the data processing apparatus 1520 through the communication interface 1516.

In an embodiment, when the size of the tip is not suitable for a current scan ROI, the image processor 1517 may adjust a scan ROI to fit the size of the tip, and obtain two-dimensional image data based on the adjusted scan ROI, under the control by the processor 1511.

The processor 1511 may control the entire intraoral scanner 1510.

In an embodiment, the processor 1511 may obtain tip information through the sensing unit 1513.

In an embodiment, the processor 1511 may detect a reflective mirror area from the two-dimensional image data obtained by the image processor 1517, and obtain at least one of the direction of the tip and the size of the tip based on at least one of a size or shape of the reflective mirror area.

In an embodiment, the processor 1511 may transmit the tip information and the two-dimensional image data to the data processing apparatus 1520 through the communication interface 1516.

Alternatively, in another embodiment, the processor 1511 may directly obtain an oral image from the two-dimensional image data based on the tip information, and transmit the obtained oral image to the data processing apparatus 1520.

The processor 1511 may identify an oral image obtainment mode based on the tip information. The processor 1511 may extract the oral image obtainment mode from the memory 1512 and use the same to identify the oral image obtainment mode according to the tip information.

When the tip information is about the fastening direction of the tip, the processor 1511 may identify a scan mode according to the fastening direction of the tip. For example, the processor 1511 may identify one of a maxillary scan mode, a mandibular scan mode, and an occlusal scan mode, according to whether the fastening direction of the tip is an upward, downward, or lateral direction. The processor 1511 may obtain an oral image by processing the two-dimensional image data according to the identified scan mode, and transmit the oral image to the data processing apparatus 1520 through the communication interface 1516.

In an embodiment, the processor 1511 may receive control information from the data processing apparatus 1520 and adjust the projection mode according to the control information. That is, when the data processing apparatus 1520 has identified the projection mode based on the tip information, the processor 1511 may receive control information according to the projection mode generated by the data processing apparatus 1520 and operate accordingly. The control information may be information that controls the intraoral scanner to operate in a general projection mode when the tip is a general-sized tip, and controls the intraoral scanner to operate in a small projection mode when the tip is a small-sized tip.

Alternatively, in an embodiment, the processor 1511 may identify that the oral image obtainment mode is the projection mode, based on the tip information, and directly control the intraoral scanner such that the intraoral scanner operates according to the identified projection mode.

In an embodiment, when the tip information is about the size of the tip, the processor 1511 may control the intraoral scanner 1510 to operate in different projection modes when the tip has a general size and a small size.

When the tip has a small size and the current projection mode is set to the general projection mode, the processor 1511 may control the intraoral scanner 1510 to operate in the small projection mode, such that the optical unit 1514 projects light by reducing the projection area from the first projection area to the second projection area, and the image processor 1517 reduce a scan ROI of the camera from a first ROI to a second ROI.

Alternatively, the processor 1511 may directly detect a projection area suitable for the size of the tip. For this, the processor 1511 may control the optical unit 1514 to project light having a certain pattern from a certain projection area and control the image processor 1517 to obtain an oral image in a certain area. The processor 1511 may detect a reflective mirror area of the tip by using a certain pattern in an oral image obtained from a certain ROI. The processor 1511 may change the projection area to a projection area corresponding to the detected reflective mirror area.

The processor 1511 may change the ROI to a scan ROI corresponding to the changed projection area.

The processor 1511 may control at least one component included in the intraoral scanner to perform an intended operation. Accordingly, even though a case in which the processor performs certain operations is described as an example, it may mean that the processor controls at least one component included in the data processing apparatus, such that certain operations are performed.

Hereinafter, the data processing apparatus 1520 is described. The data processing apparatus 1520 may be referred to as the oral image processing apparatus.

The data processing apparatus 1520 may include a communication interface 1524, a user interface 1523, a display 1525, an image processor 1526, a memory 1522, and a processor 1521.

The communication interface 1524 may communicate with at least one external electronic apparatus through a wired or wireless communication network. In detail, the communication interface 1524 may communicate with the intraoral scanner 1510 under control by the processor 1521. The communication interface 1524 may communicate with an external electronic apparatus or server connected through the wired or wireless communication network 1530 under the control by the processor 1521.

In an embodiment, the communication interface 1524 may receive two-dimensional image data and tip information from the intraoral scanner 1510. Also, the communication interface 1524 may transmit control information to the intraoral scanner 1510.

Alternatively, the communication interface 1524 may transmit, to the intraoral scanner 1510, an oral image obtained by the intraoral scanner 1510 based on the tip information.

In detail, the communication interface 1524 may include at least one short-range communication module that performs communication according to the communication standards, such as Bluetooth, Wi-Fi, BLE, NFC/RFID, Wi-Fi direction, UWB, or Zigbee.

Also, the communication interface 1524 may further include a long-distance communication module that communicates with a server for supporting long-distance communication according to the long-distance communication standards. In detail, the communication interface 1524 may include a long-distance communication module that performs communication through a network for Internet communication. Also, the communication interface 1524 may include a long-distance communication module that performs communication through a communication network conforming to the communication standards, such as 3rd generation (3G), 4th generation (4G), and/or 5th generation (5G).

Also, in order to communicate with the external electronic apparatus (e.g., the intraoral scanner) by wire, the communication interface 1524 may include at least one port for connecting with the external electronic apparatus through a wired cable. Accordingly, the communication interface 1524 may communicate with the external electronic apparatus connected by wire through the at least one port.

The user interface 1523 may receive a user input for controlling the data processing apparatus 1520. The user interface 1523 may include a user input device including a touch panel for detecting a touch of a user, a button for receiving a push operation of the user, a mouse or keyboard for specifying or selecting a point on a user interface screen, etc., but is not limited thereto.

Also, the user interface 1523 may include a speech recognition apparatus for speech recognition. For example, the speech recognition apparatus may include a microphone, and the speech recognition apparatus may receive a speech command or speech request of a user. Accordingly, the processor may control an operation corresponding to the speech command or speech request to be performed.

The display 1525 may display a screen. In detail, the display 1525 may display a certain screen under the control by the processor 1521. In detail, the display 1525 may display a user interface screen including an oral image generated based on data obtained by the intraoral scanner 1510 scanning the oral cavity of a patient. Alternatively, the display 1525 may display a user interface screen including information related to dental treatment of the patient.

In an embodiment, the display 1525 may output, on the screen, a scan mode according to the fastening direction of the tip, received from the intraoral scanner 1510. The display 1525 may output a three-dimensional virtual model generated according to a scan mode identified based on raw data received from the intraoral scanner 1510.

The image processor 1526 may perform operations for generating and/or processing an image. In detail, the image processor 1526 may receive raw data obtained from the intraoral scanner 1510 and generate an oral image based on the received data. In detail, the image processor 1526 may generate a three-dimensional virtual model for scan data received from the intraoral scanner 1510.

The memory 1522 may store at least one instruction. Also, the memory 1522 may store at least one instruction executable by the processor. Also, the memory may store at least one program executable by the processor 1521. In addition, the memory 1522 may store data (e.g., raw data obtained through intraoral scanning) received from the intraoral scanner 1510. Alternatively, the memory may store an oral image representing the oral cavity in three dimensions. According to an embodiment, the memory 1522 may store one or more instructions for obtaining final positions of teeth in an oral image in an orthodontic plan. According to an embodiment, the memory 1522 may include one or more instructions for generating a three-dimensional virtual model with improved resolution based on an adjusted scan ROI.

The processor 1521 executes at least one instruction stored in the memory 1522 to control an intended operation to be performed. In this case, the at least one instruction may be stored in an internal memory included in the processor 1521 or in the memory 1522 included in the data processing apparatus separately from the processor 1521.

In detail, the processor 1521 may execute the at least one instruction to control at least one component included in the data processing apparatus to perform an intended operation. Accordingly, even though a case in which the processor 1521 performs certain operations is described as an example, it may mean that the processor 1521 controls at least one component included in the data processing apparatus, such that the certain operations are performed.

According to an embodiment, the processor 1521 may increase resolution of the scan ROI when a size of the scan ROI is reduced, by executing the one or more instructions stored in the memory 1522.

According to an example, the processor 1521 may be implemented in a form internally including at least one internal processor, and a memory element (e.g., a random access memory (RAM) or read-only memory (ROM)) for storing a program, instruction, signal, and data to be processed or used by the at least one internal processor.

Also, the processor 1521 may include a graphic processing unit (GPU) for graphic processing corresponding to a video. In addition, the processor 1521 may be implemented as a system on chip (SoC) in which a core and a GPU are integrated. Also, the processor may include a single core or a multi-core. For example, the processor 1521 may include a dual core, a triple core, a quad core, a hexa core, an octa core, a deca core, a dodeca core, a hexadecimal core, etc.

In a disclosed embodiment, the processor 1521 may generate an oral image based on two-dimensional image data received from the intraoral scanner 1510. In detail, the communication interface 1524 may receive data obtained from the intraoral scanner 1510, for example, raw data obtained through intraoral scanning, under the control by the processor 1521. In addition, the processor 1521 may generate a three-dimensional oral image representing the oral cavity in three dimensions, based on the raw data received from the communication interface.

In an embodiment, the processor 1521 may receive tip information from the intraoral scanner 1510.

In an embodiment, the processor 1521 may detect a reflective mirror area from the raw data received from the intraoral scanner 1510, and directly obtain tip information based on at least one of a size and shape of the reflective mirror area.

In an embodiment, when the tip information includes tip fastening direction information, the processor 1521 may identify a scan mode according to the tip fastening direction information, process two-dimensional image data according to the identified scan mode, and obtain an oral image.

In an embodiment, when the tip information includes tip size information, the processor 1521 may identify a projection mode according to the tip size information and generate control information according to the projection mode. The control information may include information that controls the intraoral scanner to operate in a projection mode suitable for the size of the tip when the size of the tip is not suitable for a current projection mode of the intraoral scanner.

In an embodiment, when the tip information includes tip size information, the processor 1521 may also adjust a size of an image to fit an image area suitable for a size of a mirror included in the tip, and obtain three-dimensional information by using only the image having the adjusted size.

The communication interface 1524 may transmit the raw data received from the intraoral scanner 1510 to the processor 1521, and the processor 1521 may generate an oral image representing the oral cavity in three dimensions, based on the received raw data.

Also, the processor 1521 may control the communication interface 1524 to directly receive the oral image representing the oral cavity in three dimensions from an external server, a medical apparatus, etc. In this case, the processor 1521 may obtain a three-dimensional oral image without generating a three-dimensional oral image based on the raw data.

According to the disclosed embodiment, when the processor 1521 performs operations such as 'extracting', 'obtaining', and 'generating', it may include not only a case in which the processor 1521 executes at least one instruction to directly perform the aforementioned operations, but also a case in which the processor 1521 controls other components such that the aforementioned operations are performed.

In order to implement the embodiments disclosed in the present disclosure, the data processing apparatus 1520 may include only some of the components shown in FIG. 14 or may include more components than those shown in FIG. 14.

Also, the data processing apparatus 1520 may store and execute dedicated software linked to the intraoral scanner 1510. In this regard, the dedicated software may be referred to as a dedicated program, a dedicated tool, or a dedicated application. When the data processing apparatus 1520 operates in conjunction with the intraoral scanner 1510, the dedicated software stored in the data processing apparatus 1520 may be connected to the intraoral scanner 1510 and receive in real time pieces of data obtained through intraoral scanning.

Also, the dedicated software may perform at least one operation for obtaining, processing, storing, and/or transmitting an oral image. In this regard, the dedicated software may be stored in the processor. Also, the dedicated software may provide a user interface for use of data obtained from the intraoral scanner. In this regard, a user interface screen provided by the dedicated software may include an oral image generated according to the disclosed embodiment.

Figure 16:
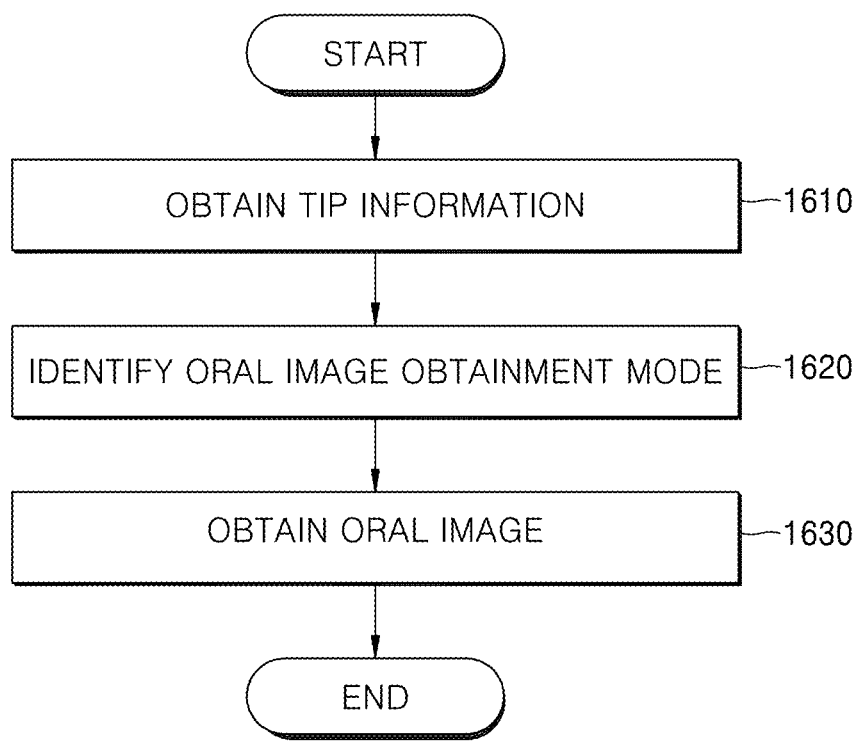
FIG. 16 is a flowchart of an oral image processing method according to an embodiment.

FIG. 16 is a flowchart of an oral image processing method according to an embodiment.

Referring to FIG. 16, the oral image processing system may detect a reflective mirror area from two-dimensional image data obtained using a sensor mounted on a main body of an intraoral scanner or a camera mounted on the main body of the intraoral scanner, and obtain tip information about a tip coupled to the main body of the intraoral scanner (operation 1610). In an embodiment, the tip information may include at least one of a fastening direction of the tip and a size of the tip.

The oral image processing system may identify an oral image obtainment mode based on the tip information (operation 1620).

The oral image obtainment mode may vary according to the tip information. For example, when the tip information includes the fastening direction of the tip, the oral image obtainment mode may refer to a scan mode according to the fastening direction of the tip. The oral image processing system may identify the scan mode according to the fastening direction of the tip. The identified scan mode may include one of a maxillary scan mode, a mandibular scan mode, and an occlusal scan mode.

Alternatively, when the tip information is about the size of the tip, the oral image obtainment mode may refer to a projection mode. The projection mode may include a general projection mode performed when a general-sized tip is fastened, and a small projection mode performed when a small-sized tip is fastened.

The oral image processing system may obtain an oral image according to the identified projection mode (operation 1630).

When the scan mode is identified according to the fastening direction of the tip, the oral image processing system may obtain an oral image according to the identified scan mode. For example, when the identified scan mode is the mandibular scan mode, the oral image processing system may generate a three-dimensional image of the mandible by using raw data obtained by capturing an image of an object.

When the projection mode is identified according to the size of the tip, the oral image processing system may obtain an oral image by adjusting a projection area and a scan ROI of the camera according to the projection mode.

Figure 17:
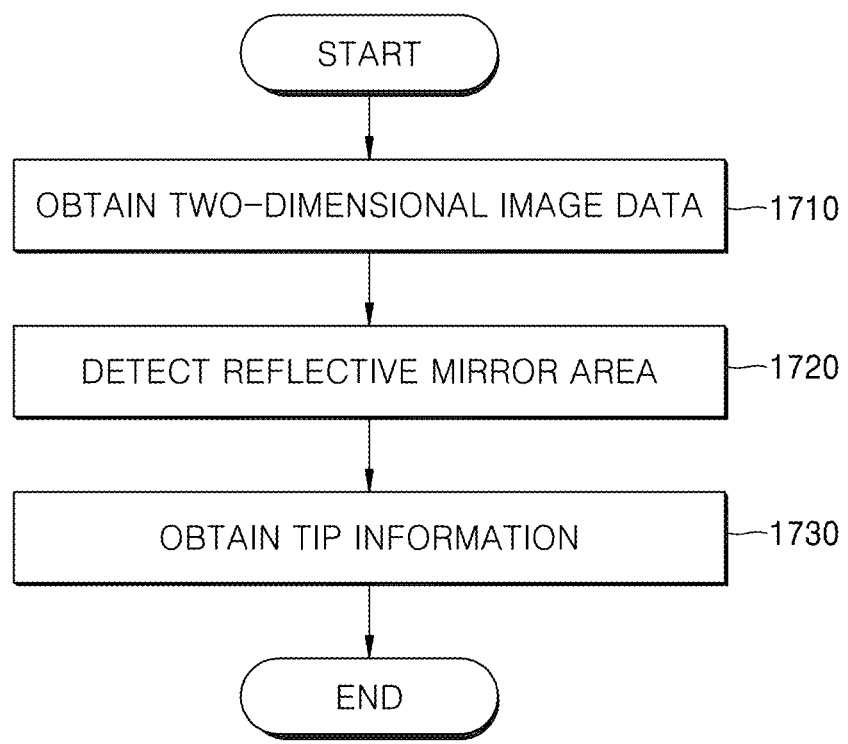
FIG. 17 is a flowchart of a process of obtaining tip information by an oral image processing system, according to an embodiment.

FIG. 17 is a flowchart of a process of obtaining tip information by an oral image processing system, according to an embodiment.

The oral image processing system may obtain two-dimensional image data of an object by using a camera mounted on a main body of an intraoral scanner (operation 1710). In this case, the oral image processing system may obtain two-dimensional image data by projecting light having a certain pattern and capturing an image of an object onto which the light having a certain pattern is emitted.

The oral image processing system may detect a reflective mirror area from the two-dimensional image data (operation 1720). The oral image processing system may identify an image area obtained for the object included in the two-dimensional image data from other areas, and detect a reflective mirror area corresponding to the image area obtained for the object. The oral image processing system may detect the reflective mirror area by identifying an area including the light having a certain pattern from an area not including the light having a certain pattern.

The oral image processing system may obtain tip information by using the reflective mirror area (operation 1730).

The oral image processing system may identify a size of a tip based on a size of the reflective mirror area. For example, the oral image processing system may identify the number of patterns corresponding to the size of the reflective mirror area in a horizontal or vertical direction, and identify a size of the image area obtained for the object according to the identified number of patterns.

Also, the oral image processing system may identify the number of patterns corresponding to lengths of the upper and lower ends of the reflective mirror area, identify which of the upper and lower ends is longer, and accordingly identify whether the tip is mounted on the main body of the intraoral scanner in a forward direction or a reverse direction.

Figure 18:
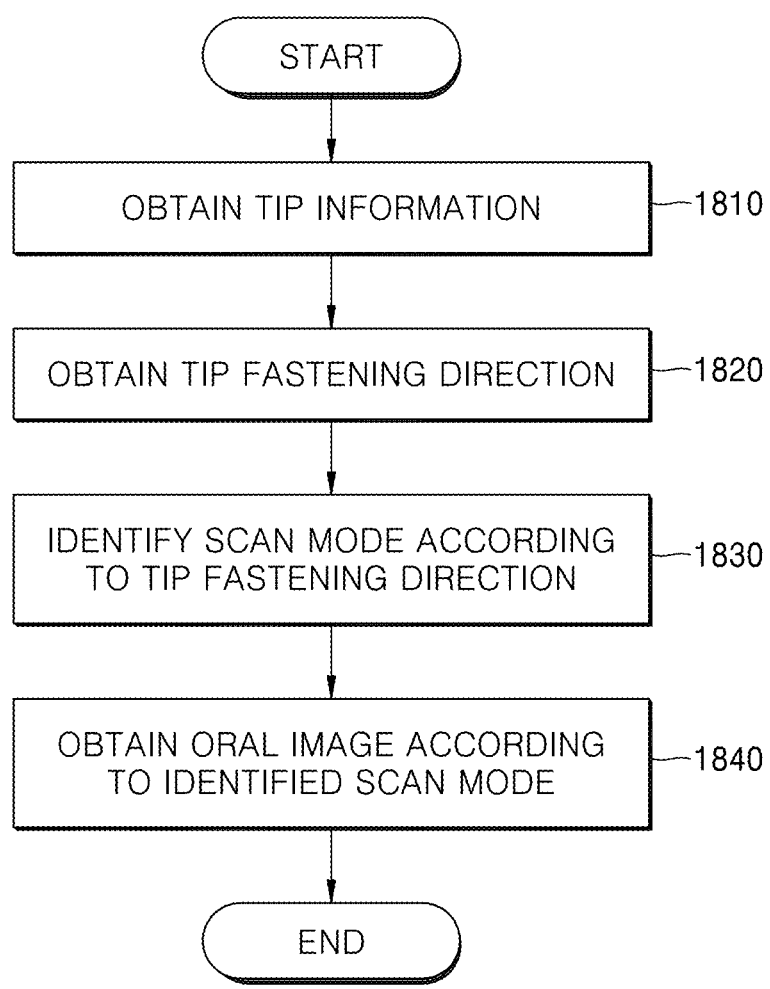
FIG. 18 is a flowchart of a process of obtaining an oral image in an identified scan mode, according to an embodiment.

FIG. 18 is a flowchart of a process of obtaining an oral image in an identified scan mode, according to an embodiment.

Referring to FIG. 18, the oral image processing system may obtain tip information (operation 1810). The oral image processing system may obtain tip information from image data obtained using a sensor or camera mounted on a main body of an intraoral scanner.

The oral image processing system may obtain a fastening direction of a tip from the tip information (operation 1820).

The oral image processing system may identify a scan mode according to the fastening direction of the tip (operation 1830). For example, when the top of the tip is fastened to the top of the main body in the same direction, the oral image processing system may identify a maxillary scan mode. When the bottom of the tip is fastened to the top of the main body in the same direction, the oral image processing system may identify a mandibular scan mode. Also, when the side surface of the tip is fastened to the top of the main body in the same direction, the oral image processing system may identify an occlusal scan mode.

The oral image processing system may obtain an oral image according to the identified scan mode (operation 1840). When the identified scan mode is the maxillary scan mode, the oral image processing system may obtain a three-dimensional oral image of the maxilla by using two-dimensional image data. When the identified scan mode is the mandibular scan mode, the oral image processing system may obtain a three-dimensional oral image of the mandible based on raw data. When the identified scan mode is the occlusal scan mode, the oral image processing system may obtain a three-dimensional oral image of the occlusion from the raw data.

Figure 19:
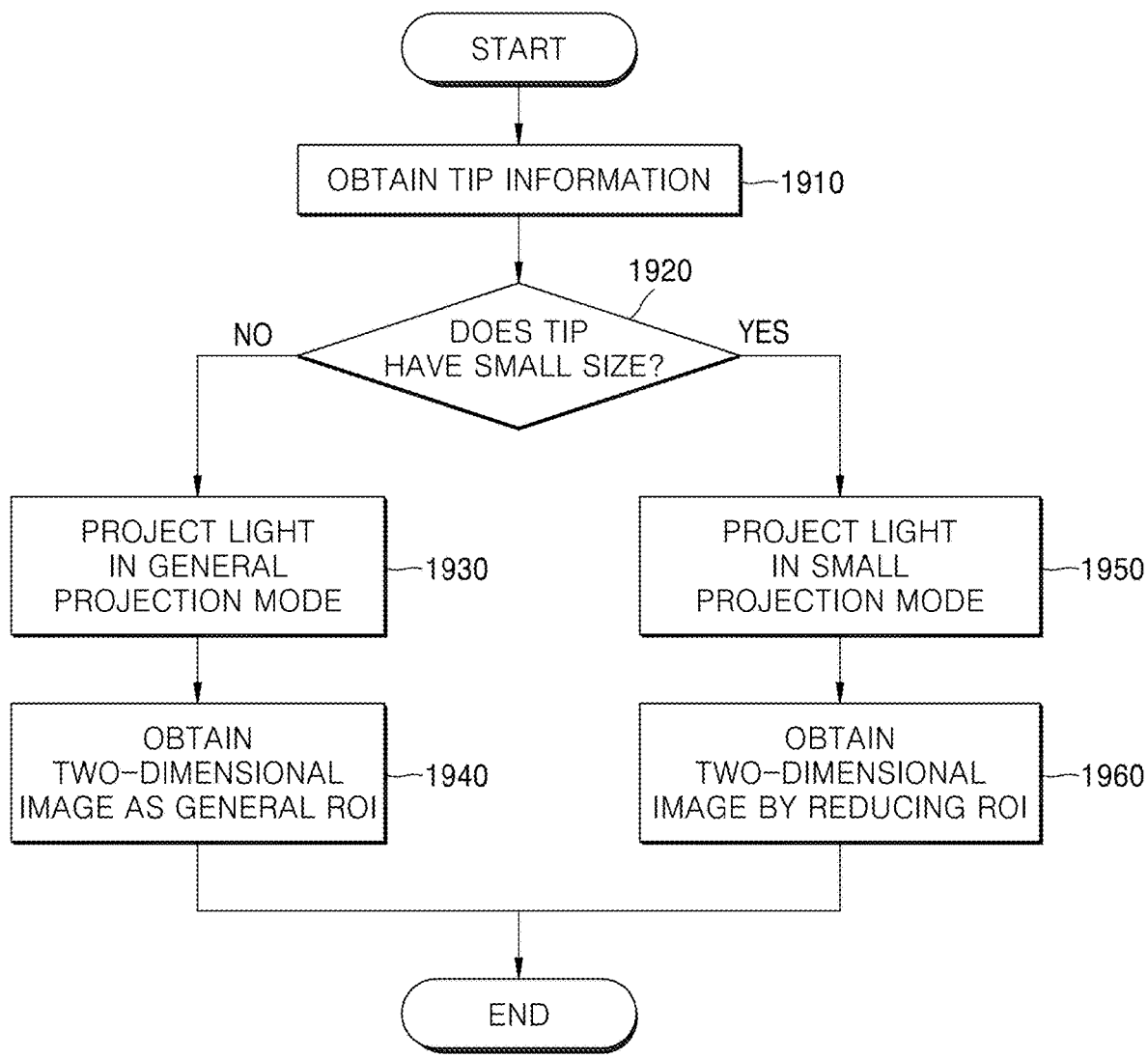
FIG. 19 is a flowchart of a method of obtaining an oral image in different projection modes according to a size of a tip, according to an embodiment.

FIG. 19 is a flowchart of a method of obtaining an oral image in different projection modes according to a size of a tip, according to an embodiment.

The oral image processing system may obtain tip information (operation 1910).

When the tip information includes information about a size of a tip, the oral image processing system may determine whether the tip has a small size (operation 1920).

When the tip has a general size rather than a small size, the oral image processing system may project light in a general projection mode (operation 1930). An area to which a projector projects light in the general projection mode may be a first projection area.

The oral image processing system may project light from the first projection area and obtain raw data from reflected light obtained as the projected light is reflected from an object. In this case, the oral image processing system may obtain two-dimensional image data as a general ROI (operation 1940). The general ROI may be a basic area in which a scan ROI of a camera is set as a default.

When the tip has a small size, the oral image processing system may operate in a small projection mode. The oral image processing system may project light in the small projection mode by reducing a projection area (operation 1950). When light is projected in the small projection mode, it may refer to projecting light by reducing an area to which the projector projects light from a second projection area that is smaller than the first projection area. The second projection area may be an area in which, when light is projected to the small-sized tip, the projected light may all be reflected by a mirror.

The oral image processing system may project light from the second projection area, and obtain raw data of the object by using the reflected light obtained as the projected light is reflected from the object. The oral image processing system may obtain two-dimensional image data by reducing the ROI to the second ROI that is smaller than the basic area (operation 1960). The reduced ROI may be an area corresponding to a size of a mirror included in the small-sized tip.

Figure 20:
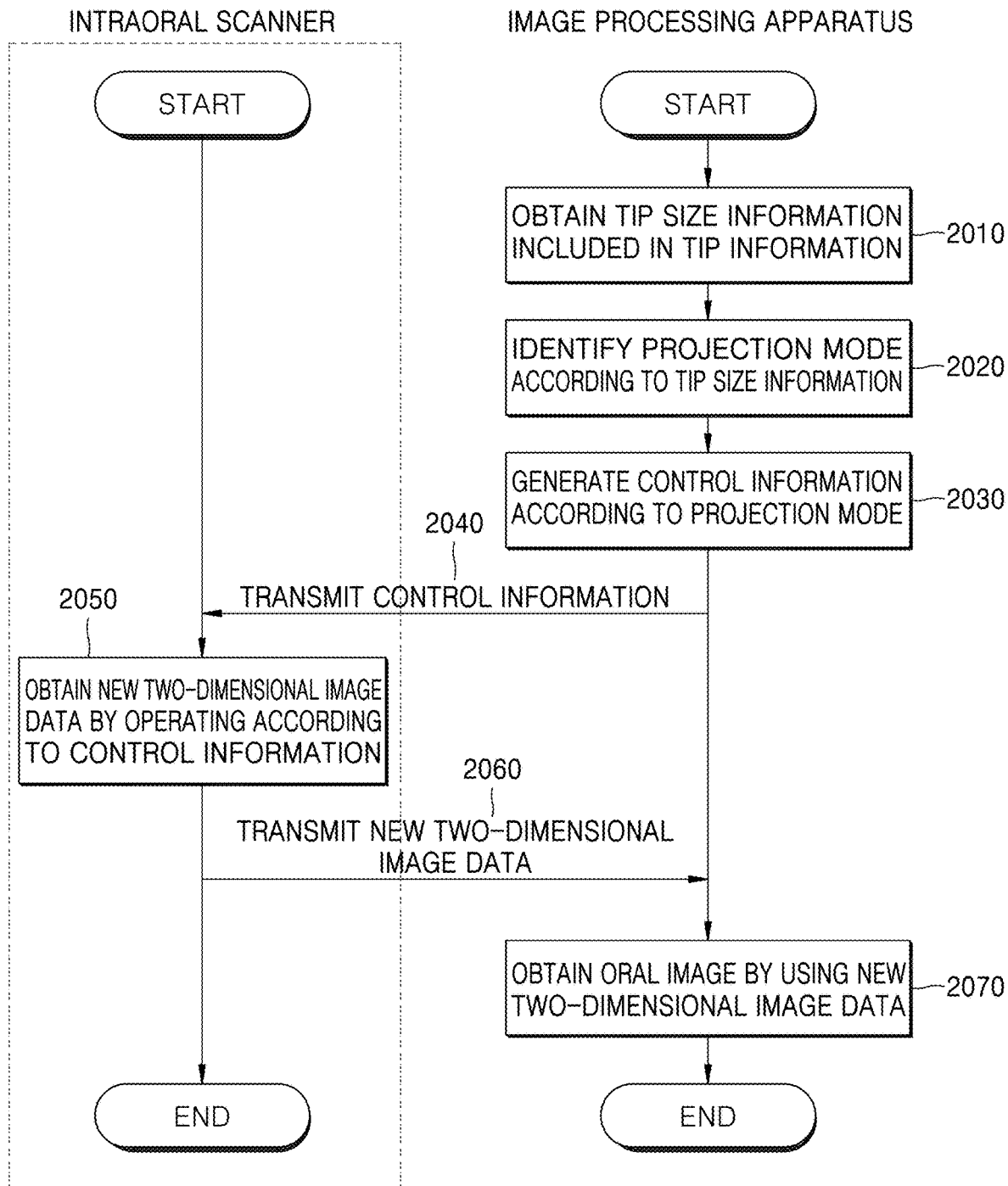
FIG. 20 is a flowchart for describing that an intraoral scanner controls a projection mode according to an image processing apparatus, according to an embodiment.

FIG. 20 is a flowchart for describing that an intraoral scanner controls a projection mode according to an image processing apparatus, according to an embodiment.

Referring to FIG. 20, the image processing apparatus may receive tip information from the intraoral scanner or may obtain tip information by analyzing two-dimensional image data received from the intraoral scanner. The image processing apparatus may obtain tip size information from the tip information (operation 2010).

The image processing apparatus may identify a projection mode according to the tip size information (operation 2020). The projection mode may include a general projection mode and a small projection mode.

The image processing apparatus may generate control information according to the projection mode (operation 2030). When it is determined that a size of a tip is not suitable for the projection mode of the intraoral scanner, the image processing apparatus may generate control information.

The image processing apparatus may transmit the control information to the intraoral scanner (operation 2040).

The intraoral scanner may receive the control information from the image processing apparatus and obtain new two-dimensional image data by operating in a projection mode according to the control information (operation 2050).

For example, when the control information is information indicating the projection mode to be set to a general projection mode, the intraoral scanner may change a current projection mode to the general projection mode. In the general projection mode, the intraoral scanner may project light from a first projection area and obtain new two-dimensional image data in a first ROI.

For example, when the control information is information indicating the projection mode to be set to a small projection mode, the intraoral scanner may change the current projection mode to a small projection mode. In the small projection mode, the intraoral scanner may project light from a second projection area that is smaller than the first projection area, and obtain new two-dimensional image data in a second ROI that is smaller than the first ROI.

The intraoral scanner may transmit the new two-dimensional image data to the image processing apparatus (operation 2060).

The image processing apparatus may obtain a three-dimensional oral image by using the new two-dimensional image data received from the intraoral scanner (operation 2070).

The oral image processing method according to the embodiments of the disclosure may be embodied as program commands executable by various computer means and may be recorded on a computer-readable recording medium. Also, according to the embodiments of the disclosure, a computer-readable storage medium having recorded thereon at least one program including at least one instruction executing the oral image processing method may be provided.

In addition, the oral image processing method according to the aforementioned embodiments of the disclosure may be embodied as a computer program product including a computer-readable recording medium having recorded thereon a program for implementing the oral image processing method including obtaining two-dimensional image data by scanning an oral cavity, obtaining tip information about a tip coupled to a main body of an intraoral scanner, identifying an oral image obtainment mode based on the tip information, and obtaining an oral image based on the two-dimensional image data and the identified oral image obtainment mode, wherein the tip information includes at least one of tip fastening direction information and tip size information.

The computer-readable storage medium may include program commands, a data file, a data structure, etc. alone or in combination. In this case, examples of the computer-readable storage medium may include magnetic media such as hard disks, floppy disks, and magnetic tapes, optical media such as compact disc (CD)-ROMs, or digital versatile discs (DVDs), magneto-optical media such as floptical disks, and hardware apparatuses specifically configured to store and execute program commands, such as ROM, RAM, flash memories, etc.

In this regard, a machine-readable storage medium may be provided in a form of a non-transitory storage medium. Here, the 'non-transitory storage medium' may mean that a storage medium is a tangible apparatus. Also, the 'non-transitory storage medium' may include a buffer where data is temporarily stored.

According to an embodiment, a method of processing an oral image according to various embodiments disclosed in the present specification may be provided by being included in a computer program product. The computer program product may be distributed in a form of a machine-readable storage medium (e.g., a CD-ROM). Alternatively, the computer program product may be distributed (e.g., downloaded or uploaded) online via an application store (e.g., Play Store™) or directly between two user apparatuses (e.g., smart phones).t In detail, the computer program product according to the disclosed embodiments may include a storage medium having recorded thereon a program including at least one instruction to perform the oral image processing method according to the disclosed embodiments.

While one or more embodiments of the disclosure have been described with reference to the figures, the scope of the disclosure is not limited thereto, and it will be understood by those of ordinary skill in the art that various changes in form and details may be made therein without departing from the spirit and scope as defined by the following claims.

The invention claimed is:

1. An image processing apparatus comprising:
   a communicator configured to transmit or receive information to or from an intraoral scanner;
   a memory storing one or more instructions; and
   a processor configured to execute the one or more instructions stored in the memory to:
      receive two-dimensional image data from the intraoral scanner through the communicator,
      receive tip information about a tip included in the intraoral scanner from the intraoral scanner through the communicator, or obtain the tip information from the two-dimensional image data,
      identify an oral image obtainment mode based on tip information, and
      obtain an oral image based on the two-dimensional image data received from the intraoral scanner through the communicator, and the identified oral image obtainment mode,
   wherein a wall of the tip has, depending on a tip size, at least one of a different thickness and a different color,
   wherein the tip information received from the intraoral scanner is obtained by a sensor in the intraoral scanner that senses either a distance from the sensor to the wall of the tip or a color of the wall of the tip,
   wherein the tip information obtained from the two-dimensional image data is based on at least one of a size and a shape of a reflective mirror area detected in the two-dimensional image data, and
   wherein the tip information comprises at least one of tip fastening direction information and tip size information.

2. The image processing apparatus of claim 1, wherein the processor is further configured to execute the one or more instructions to:
   identify a projection mode according to the tip size information, based on the tip information including the tip size information;
   generate control information according to the projection mode;
   transmit the control information to the intraoral scanner through the communicator, wherein the control information is information that controls the intraoral scanner to operate in a first projection mode when the tip is a first size tip, and controls the intraoral scanner to operate in a second projection mode when the tip is a second size tip; and
   receive, through the communicator, new two-dimensional image data obtained by the intraoral scanner operating based on the control information.

3. The image processing apparatus of claim 1, wherein the processor is further configured to execute the one or more instructions to:
   based on the tip information including the tip fastening direction information, identify a scan mode according to the tip fastening direction information; and
   obtain an oral image by processing the two-dimensional image data according to the identified scan mode, and
   the identified scan mode is one of a maxillary scan mode, a mandibular scan mode, and an occlusal scan mode.

4. An intraoral scanner comprising:
   an intraoral scanner main body; and
   a tip detachably coupled to the intraoral scanner main body,
   wherein the intraoral scanner main body comprises:
   a camera configured to obtain two-dimensional image data by scanning an oral cavity;
   a sensor configured to sense the tip;
   a memory storing one or more instructions; and
   a processor configured to execute the one or more instructions stored in the memory to:
      obtain tip information about the tip coupled to the intraoral scanner main body from the sensor or from the two-dimensional image data,
   wherein the processor is further configured to execute the one or more instructions to:
      obtain the tip information from the sensor by sensing at least one of a distance to a wall of the tip and a color of the wall of the tip, or
      obtain the tip information from the two-dimensional image data based on at least one of a size and a shape of a reflective mirror area detected in the two-dimensional image data obtained by the camera,
   wherein a wall of the tip has, depending on a tip size, at least one of a different thickness and a different color, and
   wherein the tip information comprises at least one of tip fastening direction information and tip size information.

5. The intraoral scanner of claim 4, wherein
   the tip comprises a plurality of protrusions and is rotatable while being coupled to the intraoral scanner main body, and
   the sensor is further configured to sense the tip and obtain the tip information based on at least one of a distance from the sensor to a protrusion identified according to a rotation of the tip and a color of the protrusion.

6. The intraoral scanner of claim 4, further comprising a communicator configured to transmit or receive information to or from an image processing apparatus,
wherein the communicator is further configured to transmit the obtained two-dimensional image data and the tip information to the image processing apparatus.

7. The intraoral scanner of claim 6, wherein the intraoral scanner main body further comprises a projector configured to project light,
the communicator is further configured to receive, from the image processing apparatus, control information generated based on the tip information,
the control information is information that controls the intraoral scanner to operate in a first projection mode when the tip is a first size tip, and controls the intraoral scanner to operate in a second projection mode when the tip is a second size tip, and
the processor is further configured to execute the one or more instructions to:
when the control information is information indicating operation in a first projection mode, allow the projector to project light from a first projection area and the camera to obtain two-dimensional image data from a first ROI; and
when the control information is information indicating operation in a second projection mode, allow the projector to project light from a second projection area and the camera to obtain two-dimensional image data from a second ROI, the second projection area being smaller than the first projection area, and the second ROI being smaller than the first ROI.

8. The intraoral scanner of claim 4, wherein the processor is further configured to execute the one or more instructions to:
identify an oral image obtainment mode based on the tip information; and
obtain an oral image based on the two-dimensional image data and the identified oral image obtainment mode.

9. The intraoral scanner of claim 8, wherein the processor is further configured to execute the one or more instructions to:
based on the tip information including the tip fastening direction information, identify a scan mode according to the tip fastening direction information; and
obtain the oral image by processing the two-dimensional image data according to the identified scan mode, and
the identified scan mode is one of a maxillary scan mode, a mandibular scan mode, and an occlusal scan mode.

10. The intraoral scanner of claim 8, wherein the intraoral scanner main body further comprises a projector configured to project light, and
the processor is further configured to execute the one or more instructions to:
identify a projection mode according to the tip size information, based on the tip information including the tip size information;
when the identified projection mode is a first projection mode, allow the projector to project light from the first projection area and the camera to obtain the two-dimensional image data from a first ROI; and
when the identified projection mode is a second projection mode, allow the projector to project light from a second projection area and the camera to obtain the two-dimensional image data from a second ROI, the second projection area being smaller than the first projection area, and the second ROI being smaller than the first ROI.

11. The intraoral scanner of claim 10, wherein the second projection area and the second ROI are determined based on a size of a reflective mirror area included in the two-dimensional image data.

12. An image processing method comprising:
obtaining two-dimensional image data by scanning an oral cavity;
receiving tip information from an intraoral scanner, or obtaining the tip information from the two-dimensional image data, wherein the tip information received from the intraoral scanner is obtained by a sensor in the intraoral scanner that senses either a distance to a wall of the tip or a color of the wall of the tip, and wherein the tip information obtained from the two-dimensional image data is based on at least one of a size and a shape of a reflective mirror area detected in the two-dimensional image data;
identifying an oral image obtainment mode based on the tip information; and
obtaining an oral image based on the two-dimensional image data and the identified oral image obtainment mode,
wherein a wall of the tip has, depending on a tip size, at least one of a different thickness and a different color, and
wherein the tip information comprises at least one of tip fastening direction information and tip size information.

13. The image processing method of claim 12, wherein the identifying of the oral image obtainment mode comprises, when the tip information includes the tip fastening direction information, identifying a scan mode according to the tip fastening direction information,
the obtaining of the oral image comprises obtaining the oral image by processing the two-dimensional image data according to the identified scan mode, and
the identified scan mode is one of a maxillary scan mode, a mandibular scan mode, and an occlusal scan mode.

14. The image processing method of claim 12, wherein the intraoral scanner main body further comprises the sensor configured to obtain the tip information by sensing the tip,
the tip comprises a plurality of protrusions and is rotatable while being coupled to the intraoral scanner main body, and
the obtaining of the tip information comprises obtaining the tip information based on at least one of a distance from the sensor to a protrusion identified according to a rotation of the tip and a color of the protrusion.

* * * * *